United States Patent
Yu et al.

(10) Patent No.: US 12,170,727 B2
(45) Date of Patent: Dec. 17, 2024

(54) METHOD, APPARATUS, AND DEVICE FOR KEY GENERATION AND TERMINAL PROVISIONING

(71) Applicant: Alibaba Group Holding Limited, Grand Cayman (KY)

(72) Inventors: Xiaobo Yu, Beijing (CN); Yuezhen Xiao, Shanghai (CN); Hao Wang, Shanghai (CN)

(73) Assignee: Alibaba Group Holding Limited, Grand Cayman (KY)

( * ) Notice: Subject to any disclaimer, the term of this patent is extended or adjusted under 35 U.S.C. 154(b) by 278 days.

(21) Appl. No.: 17/637,692

(22) PCT Filed: Aug. 31, 2020

(86) PCT No.: PCT/CN2020/112415
§ 371 (c)(1),
(2) Date: Feb. 23, 2022

(87) PCT Pub. No.: WO2021/043095
PCT Pub. Date: Mar. 11, 2021

(65) Prior Publication Data
US 2022/0294623 A1    Sep. 15, 2022

(30) Foreign Application Priority Data

Sep. 6, 2019   (CN) .......................... 20190842413.7

(51) Int. Cl.
*H04L 9/08*    (2006.01)
*H04L 67/141*  (2022.01)

(52) U.S. Cl.
CPC .......... *H04L 9/0866* (2013.01); *H04L 9/0825* (2013.01); *H04L 67/141* (2013.01)

(58) Field of Classification Search
CPC ....... H04L 9/0866; H04L 9/08; H04L 9/0838; H04L 9/0816; H04L 9/0822; H04L 67/141; H04L 67/14
See application file for complete search history.

(56) References Cited

U.S. PATENT DOCUMENTS 10,169,587 B1 *   1/2019  Nix .................... H04W 12/041
2003/0163697 A1 * 8/2003  Pabla ................. H04L 9/0838
                                                  713/171

(Continued)

FOREIGN PATENT DOCUMENTS

WO   WO-2018119852 A1 *  7/2018  ......... H04L 63/0869

*Primary Examiner* — Jonathan A Bui
(74) *Attorney, Agent, or Firm* — Shun Yao; Yao Legal Services, Inc.

(57) ABSTRACT

Provided in embodiments of the present application are a a key generation and terminal provisioning method, an apparatus, and a device thereof. The method for generating a key includes: sending, by an enrollee, a first request message to a configurator, the first request message comprising a first identifier, and the first identifier used to instruct the configurator to perform a network reconfiguration operation; receiving, by the enrollee, a first message sent by the configurator and including first key information; generating, by the enrollee, a session key according to the first key information; sending, by the enrollee, a second message to the configurator, the second message comprising second key information, thus allowing the configurator to generate the session key according to the second key information. In a process of an enrollee and a configurator performing provisioning for the first time, key information of each other is exchanged to generate a session key required for subsequent network reconfiguration performed on the enrollee, so that when the network reconfiguration is performed on the (Continued)

enrollee, it is unnecessary to perform an authentication process again, thereby improving the network configuration efficiency.

10 Claims, 15 Drawing Sheets

(56) References Cited

U.S. PATENT DOCUMENTS

| | | | |
|---|---|---|---|
| 2009/0092060 A1* | 4/2009 | Goto | H04W 76/14 |
| | | | 370/254 |
| 2009/0208004 A1* | 8/2009 | Kawai | H04L 9/0825 |
| | | | 380/45 |
| 2010/0195830 A1* | 8/2010 | Kubotera | H04L 9/3073 |
| | | | 380/255 |
| 2023/0308424 A1* | 9/2023 | Nix | H04L 9/085 |

* cited by examiner

METHOD, APPARATUS, AND DEVICE FOR KEY GENERATION AND TERMINAL PROVISIONING

The present application claims priority to Chinese Patent Application No. 20190842413.7, filed on Sep. 6, 2019 and entitled "METHOD, APPARATUS, AND DEVICE FOR KEY GENERATION AND TERMINAL PROVISIONING," which is incorporated herein by reference in its entirety.

TECHNICAL FIELD

The present application relates to the field of communication technologies, and in particular, to a method, an apparatus, and a device for generating a key and provisioning a terminal.

BACKGROUND

With the rapid development of communication technologies, wireless local area networks (WLAN) technologies that comply with IEEE802.11 protocol standard are widely applied in various devices. Among these devices, some of the devices have a screen (display screen), for example, smart terminal devices such as mobile phones and computers; some devices do not have a screen, for example, Internet of Things devices such as smart air conditioners and smart rice cookers.

Terminal provisioning has always been a pain point problem for the Wi-Fi Internet of Things. After purchasing a Wi-Fi Internet of Things device, a user needs to configure the device into a home Wi-Fi network. Device Provisioning Protocol (DPP) is a protocol defined by the Wi-Fi Alliance to solve the problem of terminal provisioning. The DPP consists of three sub-protocols, namely, a DPP authentication protocol, a DPP configuration protocol, and a DPP introduction protocol. The DPP authentication protocol is mainly used to enable bidirectional authentication performed between a configurator and an enrollee, and to generate a session key needed for the subsequent DPP configuration protocol. The DPP configuration protocol is mainly used to enable the enrollee to obtain, from the configurator, a service set identifier (SSID) and an access password needed for connecting to an access point (AP). The DPP Introduction protocol is mainly used between enrollees to generate, by using respective public and private keys, session keys needed for mutual communication.

After reconfiguring the SSID or the access password, the AP is usually restarted. Because the enrollee does not obtain the reconfigured information, it needs to perform the configuration for the second time, i.e., performing network reconfiguration, with the configurator, and the reconfiguration can only start from the DPP authentication protocol, resulting in increased protocol complexity and redundancy.

SUMMARY

In view of the above problems, embodiments of the present application are proposed so as to provide a method, an apparatus, and a device for key generation and terminal provisioning that overcome the above problems or at least partially solve the above problems.

In a first aspect, a method for generating a key is provided in an embodiment of the present application, comprising:
sending, by an enrollee, a first request message to a configurator, the first request message comprising a first identifier, and the first identifier used for instructing the configurator to perform a network reconfiguration operation;
receiving, by the enrollee, a first message sent by the configurator, the first message comprising first key information;
generating, by the enrollee, a session key according to the first key information; and
sending, by the enrollee, a second message to the configurator, the second message comprising second key information, thus allowing the configurator to generate the session key according to the second key information.

In a second aspect, an apparatus for generating a key located in an enrollee is provided in an embodiment of the present application, the apparatus comprising:
a sending module configured to send a first request message to a configurator, the first request message comprising a first identifier, and the first identifier used for instructing the configurator to perform a network reconfiguration operation;
a receiving module configured to receive a first message sent by the configurator, the first message comprising first key information; and
a generation module configured to generate a session key according to the first key information;
the sending module further configured to send a second message to the configurator, the second message comprising second key information, thus allowing the configurator to generate the session key according to the second key information.

In a third aspect, an enrollee is provided in an embodiment of the present application, comprising a processor and a memory, wherein the memory stores executable code, and the executable code, when executed by the processor, causes the processor to perform the method for generating a key in the first aspect.

A non-transitory machine-readable storage medium is provided in an embodiment of the present application, the non-transitory machine-readable storage medium stores executable code, and the executable code, when executed by a processor of an enrollee, causes the processor to perform the method for generating a key in the first aspect.

In a fourth aspect, a method for generating a key is provided in an embodiment of the present application, comprising:
receiving, by a configurator, a first request message sent by an enrollee, the first request message comprising a first identifier, and the first identifier used for instructing the configurator to perform a network reconfiguration operation;
sending, by the configurator, a first message to the enrollee according to the first identifier, the first message comprising first key information, thus allowing the enrollee to generate a session key according to the first key information;
receiving, by the configurator, a second message sent by the enrollee, the second message comprising second key information; and
generating, by the configurator, the session key according to the second key information.

In a fifth aspect, an apparatus for generating a key located in a configurator is provided in an embodiment of the present application, the apparatus comprising:
a receiving module configured to receive a first request message sent by an enrollee, the first request message comprising a first identifier, and the first identifier used for instructing the configurator to perform a network reconfiguration operation;

a sending module configured to send a first message to the enrollee according to the first identifier, the first message comprising first key information, thus allowing the enrollee to generate a session key according to the first key information;

the receiving module further configured to receive a second message sent by the enrollee, the second message comprising second key information; and a generation module configured to generate the session key according to the second key information.

In a sixth aspect, a configurator is provided in an embodiment of the present application, comprising a processor and a memory, wherein the memory stores executable code, and the executable code, when executed by the processor, causes the processor to perform the method for generating a key in the fourth aspect.

A non-transitory machine-readable storage medium is provided in an embodiment of the present application, the non-transitory machine-readable storage medium stores executable code, and the executable code, when executed by a processor of a configurator, causes the processor to perform the method for generating a key in the fourth aspect.

In a seventh aspect, a terminal provisioning method is provided in an embodiment of the present application, the method comprising:

sending, by an enrollee, a first request message to a configurator, the first request message comprising a first identifier, and the first identifier used for instructing the configurator to perform a network reconfiguration operation;

receiving, by the enrollee, a first message sent by the configurator, the first message comprising first key information;

generating, by the enrollee, a session key according to the first key information; and sending, by the enrollee, a second message to the configurator, the second message comprising second key information, thus allowing the configurator to generate the session key according to the second key information; and the session key used in a network reconfiguration process performed on the enrollee.

In an eighth aspect, a terminal provisioning apparatus located in an enrollee is provided in an embodiment of the present application, the apparatus comprising:

a sending module configured to send a first request message to a configurator, the first request message comprising a first identifier, and the first identifier used for instructing the configurator to perform a network reconfiguration operation;

a receiving module configured to receive a first message sent by the configurator, the first message comprising first key information; and a generation module configured to generate a session key according to the first key information;

the sending module further configured to send a second message to the configurator, the second message comprising second key information, thus allowing the configurator to generate the session key according to the second key information; and the session key used in a network reconfiguration process performed on the enrollee.

In a ninth aspect, an enrollee is provided in an embodiment of the present application, comprising: a memory and a processor, wherein the memory stores executable code, and the executable code, when executed by the processor, causes the processor to perform the terminal provisioning method according to the seventh aspect.

In a tenth aspect, a terminal provisioning method is provided in an embodiment of the present application, the method comprising:

receiving, by a configurator, a first request message sent by an enrollee, the first request message comprising a first identifier, and the first identifier used for instructing the configurator to perform a network reconfiguration operation;

sending, by the configurator, a first message to the enrollee according to the first identifier, the first message comprising first key information, thus allowing the enrollee to generate a session key according to the first key information;

receiving, by the configurator, a second message sent by the enrollee, the second message comprising second key information; and generating, by the configurator, the session key according to the second key information; and the session key used in a network reconfiguration process performed on the enrollee.

In an eleventh aspect, a terminal provisioning apparatus located in a configurator is provided in an embodiment of the present application, the apparatus comprising:

a receiving module configured to receive a first request message sent by an enrollee, the first request message comprising a first identifier, and the first identifier used for instructing the configurator to perform a network reconfiguration operation;

a sending module configured to send a first message to the enrollee according to the first identifier, the first message comprising first key information, thus allowing the enrollee to generate a session key according to the first key information;

the receiving module further configured to receive a second message sent by the enrollee, the second message comprising second key information; and a generation module configured to generate the session key according to the second key information; and the session key used in a network reconfiguration process performed on the enrollee.

In a twelfth aspect, a configurator is provided in an embodiment of the present application, comprising: a memory and a processor, wherein the memory stores executable code, and the executable code, when executed by the processor, causes the processor to perform the terminal provisioning method according to the tenth aspect.

In the key generation methods and terminal provisioning methods provided in above various aspects, in a network configuration scenario, the enrollee interacts with the configurator in the process of currently requesting the configurator to perform network configuration, and the configurator sends the first key information generated by itself to the enrollee, the enrollee sends the second key information generated by itself to the configurator, so that the configurator and the enrollee generate, according to the key information generated by themselves and other pieces of key information received from each other, session keys needed for subsequent network reconfiguration performed on the enrollee. Therefore, when network reconfiguration needs to be performed on the enrollee, it is unnecessary to perform the DPP authentication process, and only needs to perform the DPP configuration process based on the newly generated session key, thereby improving the network configuration efficiency.

In a thirteenth aspect, a method for generating a key is provided in an embodiment of the present application, comprising:

receiving, by an enrollee, an authentication request message sent by a configurator, the authentication request message comprising first random number information and second random number information;

generating, by the enrollee, a first session key and a second session key according to the first random number information, the second random number information, and third random number information and fourth random number information corresponding to the enrollee; and sending, by the enrollee, an authentication response message corresponding to the authentication request message to the configurator, the authentication response message comprising the third random number information and the fourth random number information, so that the configurator generates the first session key and the second session key according to the first random number information, the second random number information, and the third random number information and the fourth random number information.

In a fourteenth aspect, an apparatus for generating a key located in an enrollee is provided in an embodiment of the present application, the apparatus comprising:

a receiving module configured to receive an authentication request message sent by a configurator, the authentication request message comprising first random number information and second random number information;

a generation module configured to generate a first session key and a second session key according to the first random number information, the second random number information, and third random number information and fourth random number information corresponding to the enrollee; and a sending module configured to send an authentication response message corresponding to the authentication request message to the configurator, the authentication response message comprising the third random number information and the fourth random number information, thus allowing the configurator to generate the first session key and the second session key according to the first random number information, the second random number information, and the third random number information and the fourth random number information.

In a fifteenth aspect, an enrollee is provided in an embodiment of the present application, comprising a processor and a memory, wherein the memory stores executable code, and the executable code, when executed by the processor, causes the processor to perform the method for generating a key in the thirteenth aspect.

In a sixteenth aspect, a method for generating a key is provided in an embodiment of the present application, comprising:

sending, by a configurator, an authentication request message to an enrollee, the authentication request message comprising first random number information and second random number information, thus allowing the enrollee to generate a first session key and a second session key according to the first random number information, the second random number information, and third random number information and fourth random number information corresponding to the enrollee;

receiving, by the configurator, an authentication response message sent by the enrollee corresponding to the authentication request message, the authentication response message comprising the third random number information and the fourth random number information; and generating, by the configurator, the first session key and the second session key according to the first random number information, the second random number information, and the third random number information and the fourth random number information.

In a seventeenth aspect, an apparatus for generating a key located in a configurator is provided in an embodiment of the present application, the apparatus comprising:

a sending module configured to send an authentication request message to an enrollee, the authentication request message comprising first random number information and second random number information, thus allowing the enrollee to generate a first session key and a second session key according to the first random number information, the second random number information, and third random number information and fourth random number information corresponding to the enrollee;

a receiving module configured to receive an authentication response message sent by the enrollee corresponding to the authentication request message, the authentication response message comprising the third random number information and the fourth random number information; and a generation module configured to generate the first session key and the second session key according to the first random number information, the second random number information, and the third random number information and the fourth random number information.

In an eighteenth aspect, a configurator is provided in an embodiment of the present application, comprising a processor and a memory, wherein the memory stores executable code, and the executable code, when executed by the processor, causes the processor to perform the method for generating a key in the sixteenth aspect.

The method for generating a key provided in the above thirteenth aspect may be applicable to a DPP authentication process, and in the authentication process, the configurator and the enrollee each generate two random numbers, in order to generate session keys for the two provisioning processes. Using the configurator triggering the authentication process as an example, the configurator sends the two random numbers (assuming that the two random numbers are represented as I-nonce1 and I-nonce2) generated by itself to the enrollee. Likewise, the enrollee also sends the two random numbers (assuming that the two random numbers are represented as R-nonce1 and R-nonce2) generated by itself to the configurator. Therefore, the configurator and the enrollee each acquire four random numbers. The configurator and the enrollee can both generate a first session key (assuming that the first session key is represented as ke1) according to I-nonce1 and R-nonce1, and generate a second session key (assuming that the second session key is represented as ke2) according to I-nonce2 and R-nonce2. The first session key and the second session key may be used in the two subsequent network configuration processes between the enrollee and the configurator. Two session keys are generated at a time, different session keys are used in different network configuration processes, and therefore, it is unnecessary to undergo one more authentication protocol procedure in the reconfiguration process, thereby improving the network configuration efficiency.

BRIEF DESCRIPTION OF THE DRAWINGS

In order to illustrate technical solutions in embodiments of the present application more clearly, accompanying drawings that need to be used in the description of the embodiments will be introduced briefly below. It is apparent that the accompanying drawings described below are merely some embodiments in the present application, and those of ordinary skill in the art also can obtain other accompanying drawings according to these drawings without inventive effort.

DETAILED DESCRIPTION OF THE EMBODIMENTS

Figure 1:
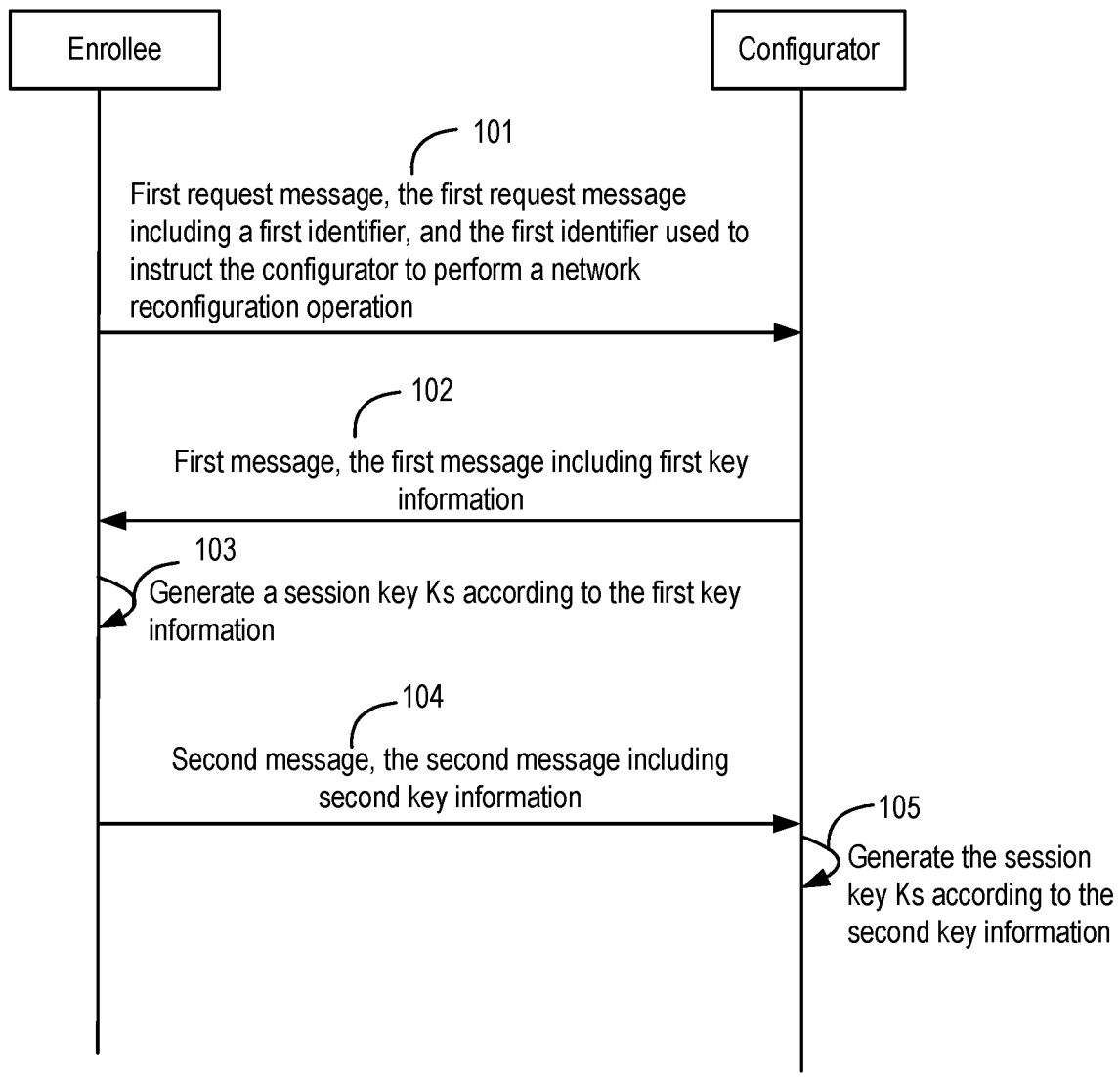
FIG. 1 is a schematic diagram of principles of a method for generating a key according to an embodiment of the present application.

To make the objectives, technical solutions, and advantages of embodiments of the present application clearer, technical solutions in the embodiments of the present application will be described clearly and completely below with reference to the accompanying drawings in the embodiments of the present application. It is apparent that the described embodiments are merely some, rather than all, of the embodiments of the present application. On the basis of the embodiments in the present application, all other embodiments obtained by those of ordinary skill in the art without inventive effort should fall within the protection scope of the present application.

Terms used in embodiments of the present application are merely for the purpose of describing particular embodiments, and are not intended to limit the present application. The singular forms "a(n)", "said", and "the" used in the embodiments of the present application and the appended claims are also intended to include plural forms, unless the context clearly dictates otherwise, and "a plurality of" generally include at least two.

Depending on the context, the words "in case of", "if" as used herein may be interpreted to mean "when" or "upon" or "in response to determining" or "in response to detecting." Similarly, the phrase "if it is determined" or "if (a stated condition or event) is detected" may be interpreted to mean "when determined" or "in response to determining" or "when (the stated condition or event) is detected" or "in response to detecting (the stated condition or event)", depending on the context.

It should be further noted that the terms "including", "comprising", or any other variant thereof are intended to cover non-exclusive inclusion, such that a commodity or system including a series of elements includes not only those elements but also other elements not explicitly listed, or further includes elements inherent in such commodity or system. In the absence of more restrictions, an element defined by the statement "including a . . . " does not exclude other identical elements in the commodity or system that includes the element.

In addition, the sequence of steps in the method embodiments described below is merely an example, and is not strictly limited.

Before specifically introducing the solutions provided in the embodiments of the present application, several concepts involved herein are described first.

An enrollee herein may be an Internet of Things device such as a smart refrigerator, a smart speaker, and a robot. Specifically, the enrollee may also be an Internet of Things device having a low power consumption requirement, such as an infrared sensor, a smoke sensor, etc. The enrollee refers to a device that needs to be provisioned, and since the device has not been connected to a certain wireless network to which the device is expected to access, the device is referred to as an enrollee.

A configurator herein may be a terminal device such as a mobile phone, a tablet computer, etc. The configurator may have accessed a certain wireless network through a network device such as an AP. For example, a mobile phone of a user has accessed a home Wi-Fi network through a wireless router installed at home.

It should be noted that the configurator may also be a terminal device that has accessed the AP and does not have a human-machine interaction screen, such as a smart refrigerator or a smart speaker. In this case, the configurator may locally store network configuration information of the AP to which it has accessed, in order to perform network configuration on the enrollee that has not accessed the AP. The network configuration information includes an SSID of the AP and an access password.

In addition, the configurator may run a provisioning application, and implement network configuration for the enrollee through the provisioning application. Herein, the configurator and the provisioning application may be equivalently exchanged.

The solutions provided in embodiments of the present application are described below.

FIG. 1 is a schematic diagram of a method for generating a key according to an embodiment of the present application. As shown in FIG. 1, the method for generating a key may include the following steps:

In 101, an enrollee sends a first request message to a configurator, the first request message includes a first identifier, and the first identifier is used for instructing the configurator to perform a network reconfiguration operation.

In a scenario in which the configurator performs network configuration on the enrollee, the method for generating a key in the present embodiment may be performed in a DPP configuration process.

The above first request message may be a request message (which may be represented as: DPP configuration request) for which the enrollee requests the configurator to perform network configuration. Moreover, the first request message may be sent to the configurator when the enrollee performs network configuration for the first time. The first identifier included in the first request message is used to indicate that the enrollee has the capability of network reconfiguration. Optionally, the first identifier may also be used to instruct the configurator to carry first key information in a DPP configuration response message to be sent subsequently. The DPP configuration response message may be a first message. The first key information may be a public key included in a connector generated by the configurator. The first identifier may be referred to as a reconfiguration status identifier (ReconfigStatus) or referred to as a send connector status identifier (SendConnectorStatus). The first identifier may also be given other names, which are not specifically limited in the present invention. Wherein, the connector generated by the configurator comprises the public key of a generated public-private key pair thereof. Generally speaking, the function of the connector is to provide a secure channel for communication connection between two devices, and the two devices may be, for example, the enrollee and the configurator.

It can be understood that the first identifier is carried in the first request message to cause the configurator to perform the network reconfiguration operation, i.e., to perform the following steps.

In 102, the configurator sends the first message to the enrollee according to the first identifier, and the first message includes the first key information.

Upon receiving the first request message, the configurator parses the first request message to find that the preset first identifier is included in the first request message, and determines that the enrollee has the capability of network reconfiguration, so as to trigger the sending of the first message including the first key information to the enrollee.

Wherein, the first key information may be the public key in the public-private key pair generated by the configurator upon receiving the first request message including the first identifier.

Optionally, the first request message may also not include the first identifier. The configurator may directly carry first key information in the first message. After receiving the first message, the enrollee may ignore the first key information in the first message if it is detected that the reconfiguration capability is not supported. Otherwise, the enrollee may carry second key information in a second message sent to the configurator.

Optionally, the first request message may further include information about the number of generated session keys. After receiving the information about the number of generated session keys, the enrollee will generate a corresponding number of connectors according to such information. For example, if the information about the number of generated session keys is 3, the configurator includes, in first information sent to the enrollee, public keys in 3 connectors, respectively, Connector$_{confC1}$, Connector$_{confC2}$, and Connector$_{confC3}$. The enrollee will sequentially generate Ks1, Ks2, and Ks3 according to the received public keys in the three connectors and a private key in a self-generated public-private key pair. Similarly, the enrollee will carry, in the second message sent to the configurator, public keys of 3 connectors, respectively, Connector$_{confE1}$, Connector$_{confE2}$, and Connector$_{confE3}$. The configurator will sequentially generate Ks1, Ks2, and Ks3 according to the received public keys in the three connectors and a private key in a self-generated public-private key pair. The three session keys are sequentially used for a second configuration process, a third configuration process, and a fourth configuration process. After receiving and sending a connection status query result message in the configuration process, the configurator and the enrollee will delete the session key used in the current provisioning process.

For ease of description, illustration is made herein only using generation of a session key Ks required in the second configuration process as an example.

In 103, the enrollee generates the session key Ks according to the first key information.

After sending the above first request message, the enrollee may generate a public-private key pair, and use the public key as the second key information.

After obtaining the first key information, the enrollee generates, in combination with the self-generated second key information (that is, in combination with a private key corresponding to the self-generated public key), the session key Ks needed for subsequent network reconfiguration for the enrollee.

Wherein, the session key Ks is calculated as follows:

N=first key information * a private key corresponding to second key information;

Session key Ks=HKDF (< >, "DPP second config", N.x).

Wherein, * represents multiplication; "DPP second config" represents that there is a character string here, a value thereof may be customized; < > used as a salt passed to an HKDF, which represents an unsalted HKDF call; and HKDF represents a specific key derivation function (HMAC-based key derivation function).

Wherein, in the process of using the HKDF function, each point on the elliptic curve has (x, y) coordinates. A complex number element may be converted to a scalar by using the x coordinate thereof and ignoring the y coordinate thereof. For example: val=Pub.x.

Based on this, N.x represents the scalar of a complex number N, and x may be the abscissa corresponding to the complex number N on the elliptical curve.

As previously described, the first key information is the public key in the public-private key pair generated by the configurator, and the second key information is the public key in the public-private key pair generated by the enrollee.

In 104, the enrollee sends a second message to the configurator, and the second message includes the second key information.

In 105, the configurator generates the session key Ks according to the second key information.

The manner in which the configurator generates the session key Ks is the same as the manner in which the enrollee generates the session key Ks. It can be understood that both the enrollee and the configurator eventually obtain the same session key, which is represented as Ks.

In an optional embodiment, the session key Ks generated by the configurator and the enrollee can be used in a network reconfiguration process performed on the enrollee.

Herein, the network reconfiguration means that: assuming that the enrollee has accessed the AP in a network configuration process for the first time; subsequently, since an SSID or an access password of the AP is updated, the AP is triggered to restart. After the AP is restarted, at this time, the enrollee does not obtain new network configuration information of the AP, so that the enrollee and the AP are disconnected. Therefore, network reconfiguration needs to be performed on the enrollee to allow it to access the AP again. Based on this, the session key Ks can be used in the network reconfiguration process performed on the enrollee.

It can be understood that when the session key Ks is used in the network reconfiguration process performed on the enrollee, if the enrollee accesses the AP again, the session key Ks will become invalid. That is, data exchange between the enrollee and the configurator is no longer encrypted using the session key Ks. Certainly, optionally, a life cycle of the session key Ks may also be set. For example, after the enrollee accesses the AP again, data exchange between the enrollee and the configurator can also be encrypted using the session key Ks.

The embodiment shown in FIG. 1 is merely a brief introduction on principles of the method for generating a key, and some specific implementation processes of the method for generating a key are exemplarily described below with reference to the following embodiments.

Figure 2:
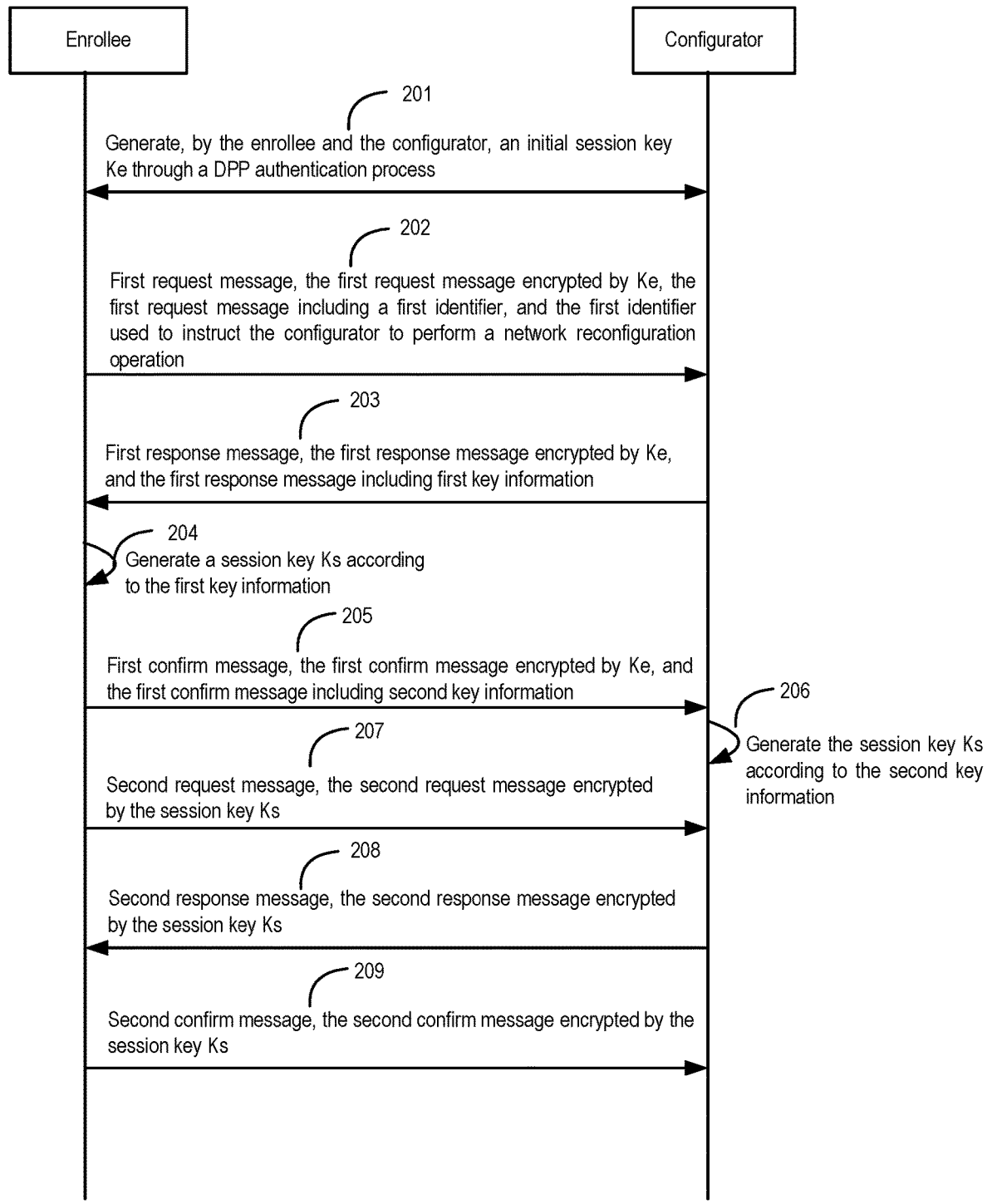
FIG. 2 is a schematic flowchart of a method for generating a key according to an embodiment of the present application.

FIG. 2 is a schematic flowchart of a method for generating a key according to an embodiment of the present application. As shown in FIG. 2, the method for generating a key may include the following steps:

In 201, an enrollee and a configurator generate an initial session key Ke through a DPP authentication process.

In this embodiment, optionally, performing of the DPP authentication process may be triggered when the configurator performs network configuration on the enrollee for the first time. The DPP authentication process may be initiated by the enrollee, or may be initiated by the configurator.

The session key Ke may be generated in the DPP authentication process (the generation of Ke belongs to the prior art, and details thereof would not be repeated), in the subsequent process of performing the network configuration on the enrollee for the first time, the session key Ke may be used to encrypt a message exchanged between the enrollee and the configurator for transmission.

In 202, the enrollee sends a first request message to the configurator, the first request message is encrypted by Ke, the first request message includes a first identifier, and the first identifier is used to instruct the configurator to perform a network reconfiguration operation.

In 203, the configurator sends a first response message corresponding to the first request message to the enrollee according to the first identifier, the first response message is encrypted by Ke, and the first response message includes first key information.

In 204, the enrollee generates a session key Ks according to the first key information.

In 205, the enrollee sends a first confirm message corresponding to the first response message to the configurator, the first confirm message is encrypted by Ke, and the first confirm message includes second key information.

In 206, the configurator generates the session key Ks according to the second key information.

The above step 201 to step 206 may be performed in a process of the configurator performing network configuration on the enrollee for the first time.

Wherein, the first request message may also be referred to as a DPP configuration request and may be represented as DPP Configuration Request, which carries the above described first identifier, which may be represented as SecondConfigStatus.

In response to the first request message, the configurator sends the first response message to the enrollee, and the first response message includes the first key information. The first key information may be a public key currently generated by the configurator, and the first key information may be represented as: Connector$_{confC}$. Reference may be made to the description in the aforementioned embodiment for the process of the enrollee generating the session key Ks according to Connector$_{confC}$. Connector is the connector. The first response message may be represented as DPP configuration Response, and therefore, the first response message may also be referred to as a first DPP configuration confirm message.

If the enrollee successfully receives the first response message, it may send a first confirm message including the second key information to the configurator, and the first confirm message may be represented as DPP configuration confirm. Wherein, the second key information may be a public key in a public-private key pair currently generated by the enrollee. The first key information may be represented as: Connector$_{confE}$. Reference may be made to the description in the aforementioned embodiment for the process of the configurator generating the session key Ks according to Connector$_{confE}$.

At this point, in the first network configuration process for the enrollee, the session key Ks needed to perform the network reconfiguration on the enrollee is generated.

In 207, the enrollee sends a second request message to the configurator, and the second request message is encrypted by the session key Ks.

In 208, the configurator sends a second response message corresponding to the second request message to the enrollee, and the second response message is encrypted by the session key Ks.

In 209, the enrollee sends a second confirm message to the configurator, and the second confirm message is encrypted by the session key Ks.

Wherein, the second confirm message may be represented as DPP configuration confirm, and therefore, the second response message may also be referred to as a second DPP configuration confirm message.

The above step 207 to step 208 may be performed in the network reconfiguration process performed by the configurator on the enrollee.

In a practical application, changes to the SSID or access password of the AP are often caused by manual update of the user. Therefore, after changing the SSID or access password of the AP, the user may optionally apply a trigger operation to the enrollee, thus triggering the enrollee to perform step 207. For example, the enrollee may be equipped with a button for starting provisioning, and the user presses the button to trigger the enrollee to perform step 207.

Figure 3:
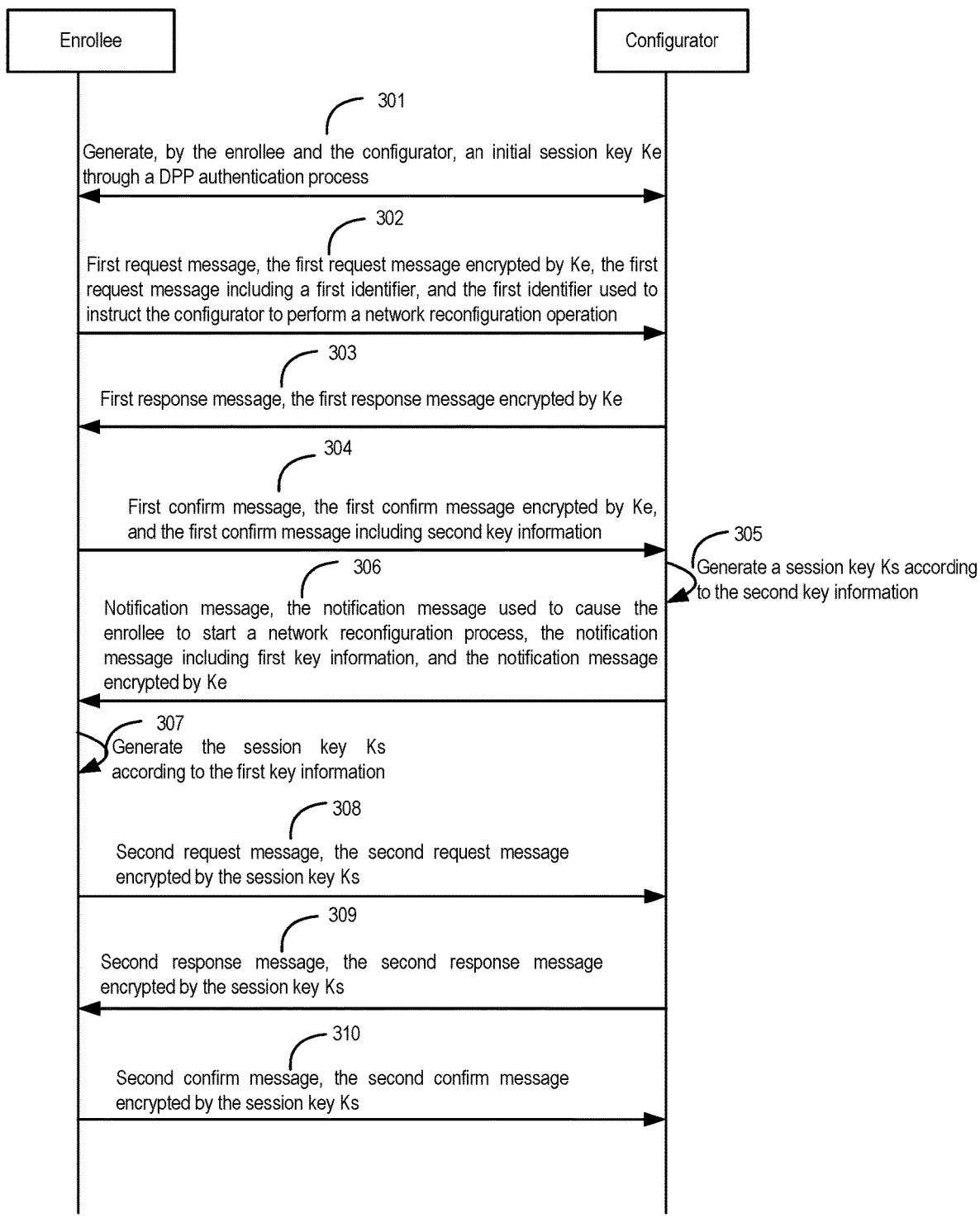
FIG. 3 is a schematic flowchart of a method for generating a key according to another embodiment of the present application.

FIG. 3 is a schematic flowchart of a method for generating a key according to another embodiment of the present application. As shown in FIG. 3, the method for generating a key may include the following steps:

In 301, an enrollee and a configurator generate an initial session key Ke through a DPP authentication process.

In 302, the enrollee sends a first request message to the configurator, the first request message is encrypted by Ke, the first request message includes a first identifier, and the first identifier is used to instruct the configurator to perform a network reconfiguration operation.

In 303, the configurator sends a first response message corresponding to the first request message to the enrollee according to the first identifier, and the first response message is encrypted by Ke.

In 304, the enrollee sends a first confirm message corresponding to the first response message to the configurator, the first confirm message is encrypted by Ke, and the first confirm message includes second key information.

In 305, the configurator generates a session key Ks according to the second key information.

Optionally, the first response message may include current first network configuration information of an AP, thus allowing the enrollee to access the AP according to the first network configuration information.

In an optional embodiment, after receiving the first confirm message, the enrollee may send a connection status query result message (which may be represented as: Status Query Result) to the configurator after a preset time interval to inform the configurator whether the enrollee and the AP are in a connected state. Based on this, optionally, the enrollee may also carry second key information in the connection status report information, so as to be sent to the configurator.

In 306, the configurator sends a notification message to the enrollee, the notification message is used to cause the enrollee to start a network reconfiguration process, the notification message includes first key information, and the notification message is encrypted by Ke.

In step 306, when the enrollee cannot access the AP, the configurator may be triggered to send the notification message to the enrollee. Optionally, when network configuration information of the AP changes, the user may trigger, by operating the configurator to scan a two dimensional code set on the enrollee, the configurator to send the notification message to the enrollee.

It should be noted that the enrollee is often a low power consumption device. In order to reduce energy consumption, the enrollee is configured to operate in a passive monitoring mode, and periodically monitor the notification message sent by the configurator when it is found that the AP cannot be accessed. If the enrollee is not a low power consumption device, the enrollee may, upon detecting that the AP cannot be accessed, directly return to a configuration channel, and periodically send a DPP configuration request message (that is, corresponding to the second request message below) on the configuration channel, the sent DPP configuration request message is encrypted by Ks.

Optionally, a preset second identifier may be carried in the notification message, and the second identifier is used to instruct the enrollee to start the network reconfiguration process. In other words, upon receiving the notification message including the second identifier, the enrollee starts to perform the network reconfiguration process, that is, to perform the following steps.

In 307, the enrollee generates the session key Ks according to the first key information.

In 308, the enrollee sends a second request message to the configurator, and the second request message is encrypted by the session key Ks.

In 309, the configurator sends a second response message corresponding to the second request message to the enrollee, and the second response message is encrypted by the session key Ks.

In 310, the enrollee sends a second confirm message to the configurator, and the second confirm message is encrypted by the session key Ks.

As can be seen from the embodiments shown in FIG. 2 and FIG. 3, transmission timing of the above first key information and second key information is not strictly limited, as long as the session key Ks is generated before the reconfiguration process is started.

The embodiments shown in FIG. 2 and FIG. 3 focus on how to perform a method for generating a key in a network configuration process on an enrollee. Correspondingly, when this method for generating a key is used, reference may be made to the following embodiments for implementing the terminal provisioning solution.

Figure 4:
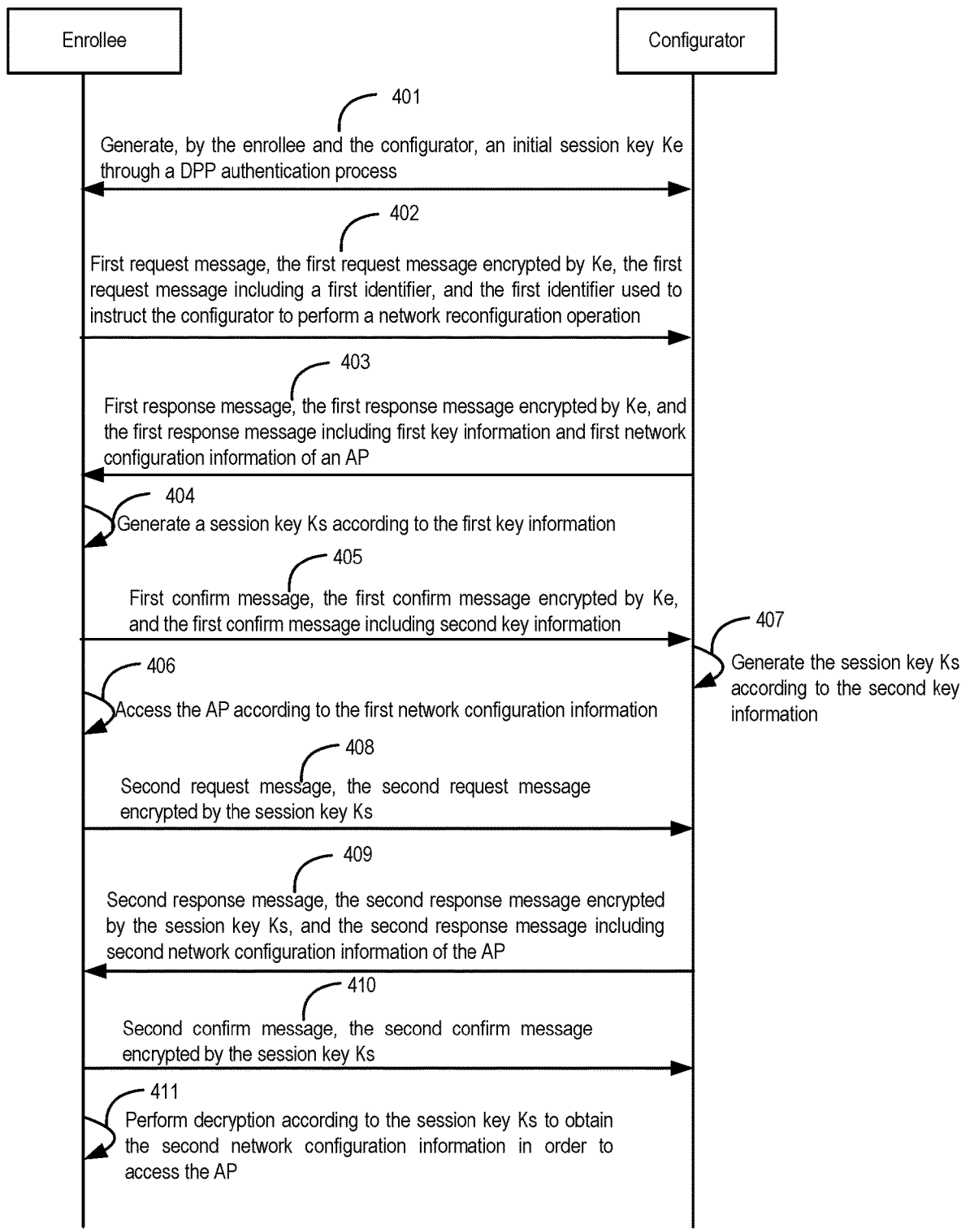
FIG. 4 is a schematic flowchart of a terminal provisioning method according to an embodiment of the present application.

FIG. 4 is a schematic flowchart of a terminal provisioning method according to an embodiment of the present application. As shown in FIG. 4, the terminal provisioning method may include the following steps:

In 401, an enrollee and a configurator generate an initial session key Ke through a DPP authentication process.

In 402, the enrollee sends a first request message to the configurator, the first request message is encrypted by Ke, the first request message includes a first identifier, and the first identifier is used to instruct the configurator to perform a network reconfiguration operation.

In 403, the configurator sends a first response message corresponding to the first request message to the enrollee according to the first identifier, the first response message is encrypted by Ke, and the first response message includes first key information and first network configuration information of an AP.

In 404, the enrollee generates a session key Ks according to the first key information.

In 405, the enrollee sends a first confirm message corresponding to the first response message to the configurator, the first confirm message is encrypted by Ke, and the first confirm message includes second key information.

In 406, the enrollee accesses the AP according to the first network configuration information.

The configurator may also carry the network configuration information (referred to as the first network configuration information) of the current AP in the first response message for transmission to the enrollee.

The enrollee performs decryption by using Ke to obtain the first network configuration information, and then accesses the AP.

In 407, the configurator generates the session key Ks according to the second key information.

In 408, the enrollee sends a second request message to the configurator, and the second request message is encrypted by the session key Ks.

In 409, the configurator sends a second response message corresponding to the second request message to the enrollee, the second response message is encrypted by the session key Ks, and the second response message includes second network configuration information of the AP.

After the network configuration information of the AP changes, the current network configuration information of the AP is referred to as the second network configuration information.

In 410, the enrollee sends a second confirm message to the configurator, and the second confirm message is encrypted by the session key Ks.

In 411, the enrollee performs decryption according to the session key Ks to obtain the second network configuration information in order to access the AP.

Figure 5:
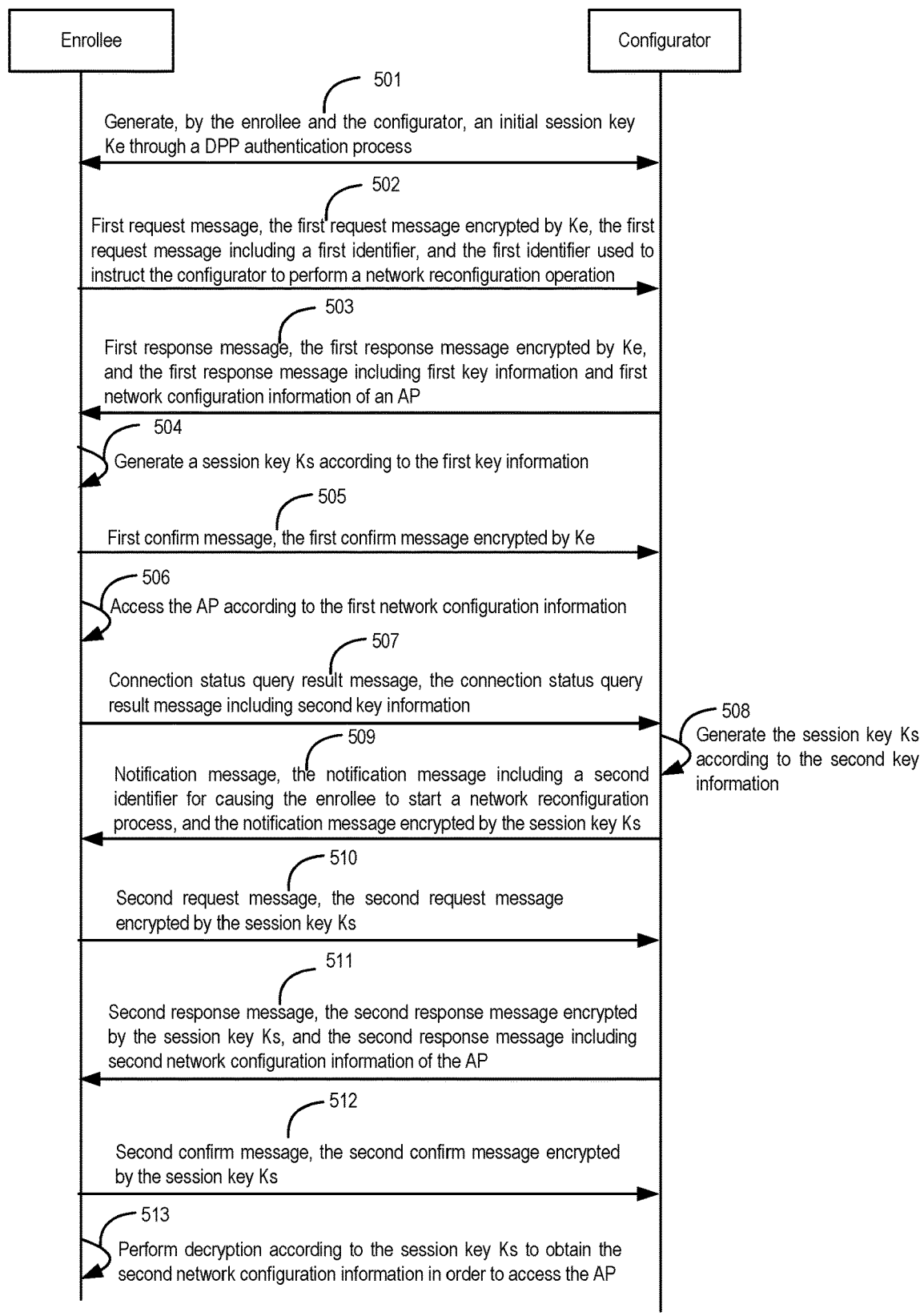
FIG. 5 is a schematic flowchart of a terminal provisioning method according to another embodiment of the present application.

FIG. 5 is a schematic flowchart of a terminal provisioning method according to another embodiment of the present application. As shown in FIG. 5, the terminal provisioning method may include the following steps:

In 501, an enrollee and a configurator generate an initial session key Ke through a DPP authentication process.

In 502, the enrollee sends a first request message to the configurator, the first request message is encrypted by Ke, the first request message includes a first identifier, and the first identifier is used to instruct the configurator to perform a network reconfiguration operation.

In 503, the configurator sends a first response message corresponding to the first request message to the enrollee according to the first identifier, the first response message is encrypted by Ke, and the first response message includes first key information and first network configuration information of an AP.

In 504, the enrollee generates a session key Ks according to the first key information.

In 505, the enrollee sends a first confirm message corresponding to the first response message to the configurator, and the first confirm message is encrypted by Ke.

In 506, the enrollee accesses the AP according to the first network configuration information.

In 507, the enrollee sends a connection status query result message to the configurator, and the connection status query result message includes second key information.

It can be understood that the connection status query result message may further include a field indicating whether the enrollee and the AP are in a connected state.

In 508, the configurator generates the session key Ks according to the second key information.

In 509, the configurator sends a notification message to the enrollee, the notification message includes a second identifier, thus causing the enrollee to start a network reconfiguration process, and the notification message is encrypted by the session key Ks.

In 510, the enrollee sends a second request message to the configurator, and the second request message is encrypted by the session key Ks.

In 511, the configurator sends a second response message corresponding to the second request message to the enrollee, the second response message is encrypted by the session key Ks, and the second response message includes second network configuration information of the AP.

The second network configuration information includes an SSID and an access password corresponding to the SSID. Wherein, the SSID and/or the access password in the second network configuration information are different from the SSID and access password included in the first network configuration information.

In 512, the enrollee sends a second confirm message to the configurator, and the second confirm message is encrypted by the session key Ks.

In 513, the enrollee performs decryption according to the session key Ks to obtain the second network configuration information in order to access the AP.

Figure 6:
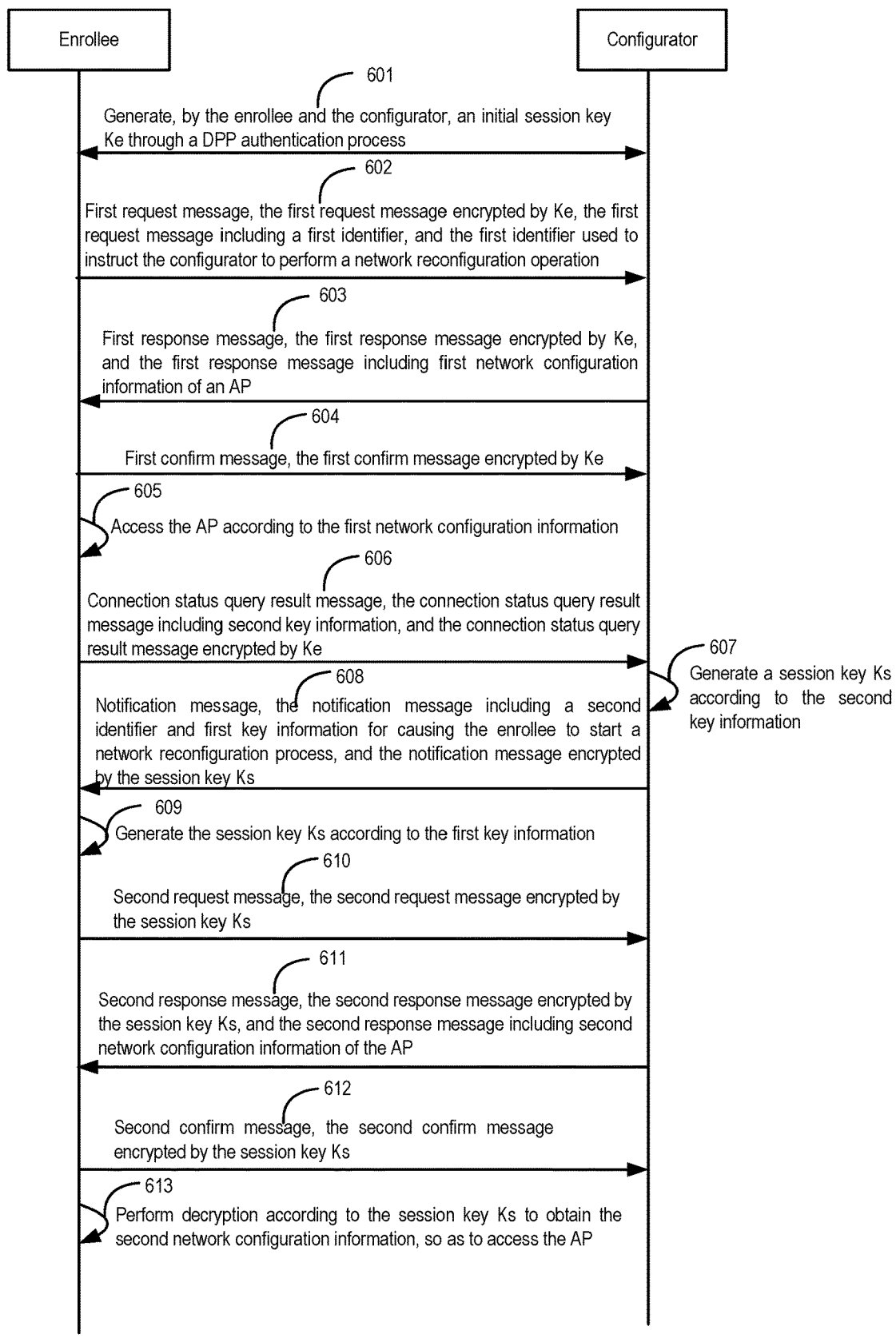
FIG. 6 is a schematic flowchart of a terminal provisioning method according to another embodiment of the present application.

FIG. 6 is a schematic flowchart of a terminal provisioning method according to another embodiment of the present application. As shown in FIG. 6, the terminal provisioning method may include the following steps:

In 601, an enrollee and a configurator generate an initial session key Ke through a DPP authentication process.

In 602, the enrollee sends a first request message to the configurator, the first request message is encrypted by Ke, the first request message includes a first identifier, and the first identifier is used to instruct the configurator to perform a network reconfiguration operation.

In 603, the configurator sends a first response message corresponding to the first request message to the enrollee according to the first identifier, the first response message is encrypted by Ke, and the first response message includes first network configuration information of an AP.

In 604, the enrollee sends a first confirm message corresponding to the first response message to the configurator, and the first confirm message is encrypted by Ke.

In 605, the enrollee accesses the AP according to the first network configuration information.

In 606, the enrollee sends a connection status query result message to the configurator, the connection status query result message includes second key information, and the connection status query result message is encrypted by Ke.

In 607, the configurator generates a session key Ks according to the second key information.

In 608, the configurator sends a notification message to the enrollee, the notification message includes a second identifier and first key information, thus causing the enrollee to start a network reconfiguration process, and the notification message is encrypted by Ke.

In 609, the enrollee generates the session key Ks according to the first key information.

In 610, the enrollee sends a second request message to the configurator, and the second request message is encrypted by the session key Ks.

In 611, the configurator sends a second response message corresponding to the second request message to the enrollee, the second response message is encrypted by the session key Ks, and the second response message includes second network configuration information of the AP.

In 612, the enrollee sends a second confirm message to the configurator, and the second confirm message is encrypted by the session key Ks.

In 613, the enrollee performs decryption according to the session key Ks to obtain the second network configuration information in order to access the AP.

Figure 7:
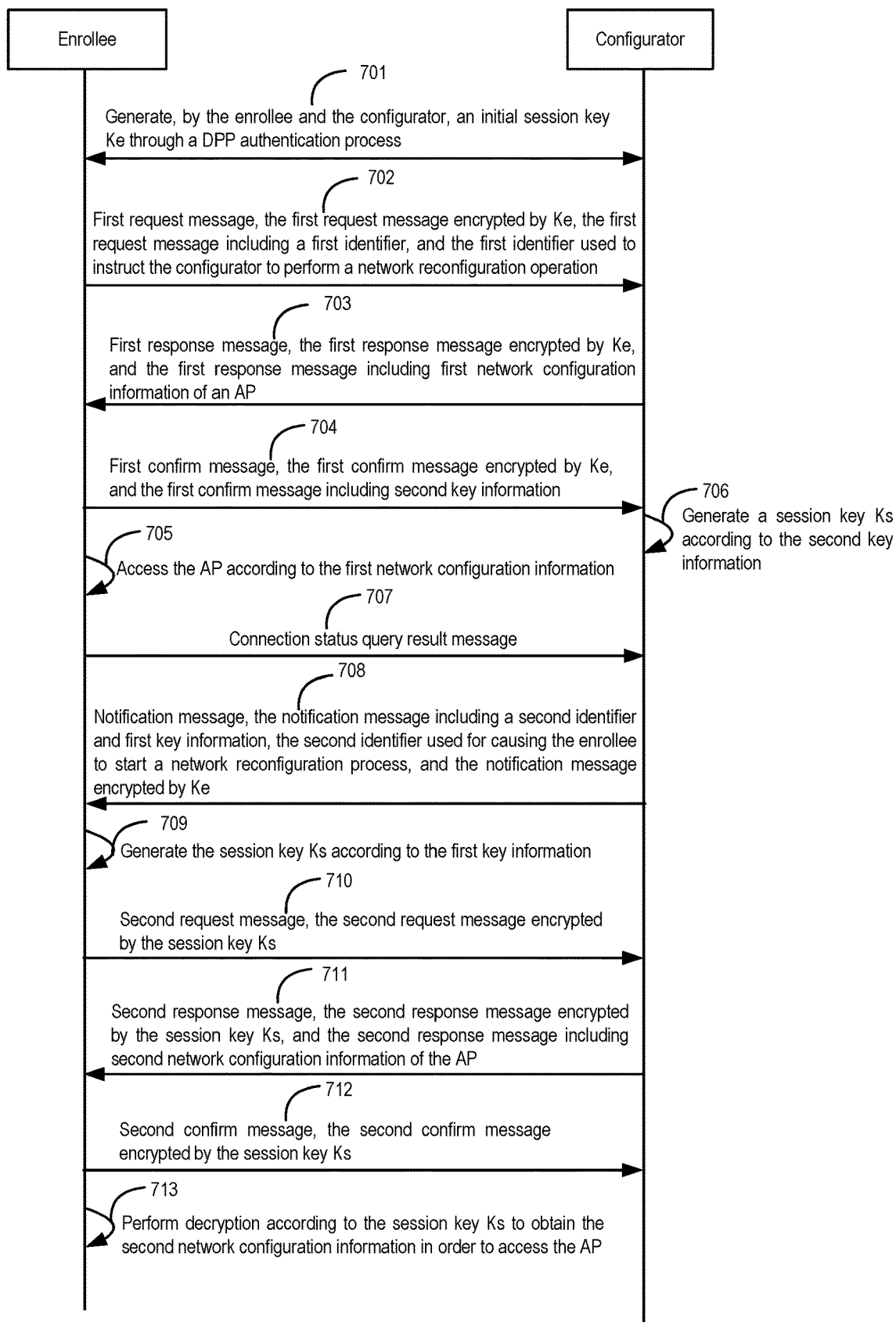
FIG. 7 is a schematic flowchart of a terminal provisioning method according to another embodiment of the present application.

FIG. 7 is a schematic flowchart of a terminal provisioning method according to another embodiment of the present application. As shown in FIG. 7, the terminal provisioning method may include the following steps:

In 701, an enrollee and a configurator generate an initial session key Ke through a DPP authentication process.

In 702, the enrollee sends a first request message to the configurator, the first request message is encrypted by Ke, the first request message includes a first identifier, and the first identifier is used to instruct the configurator to perform a network reconfiguration operation.

In 703, the configurator sends a first response message corresponding to the first request message to the enrollee according to the first identifier, the first response message is encrypted by Ke, and the first response message includes first network configuration information of an AP.

In 704, the enrollee sends a first confirm message corresponding to the first response message to the configurator, the first confirm message is encrypted by Ke, and the first confirm message includes second key information.

In 705, the enrollee accesses the AP according to the first network configuration information.

In 706, the configurator generates a session key Ks according to the second key information.

In 707, the enrollee sends a connection status query result message to the configurator.

In 708, the configurator sends a notification message to the enrollee, the notification message includes a second identifier and first key information, the second identifier is used to cause the enrollee to start a network reconfiguration process, and the notification message is encrypted by Ke.

In 709, the enrollee generates a session key Ks according to the first key information.

In 710, the enrollee sends a second request message to the configurator, and the second request message is encrypted by the session key Ks.

In 711, the configurator sends a second response message corresponding to the second request message to the enrollee, the second response message is encrypted by the session key Ks, and the second response message includes second network configuration information of the AP.

In 712, the enrollee sends a second confirm message to the configurator, and the second confirm message is encrypted by the session key Ks.

In 713, the enrollee performs decryption according to the session key Ks to obtain the second network configuration information in order to access the AP.

To sum up, the above various embodiments provide a new implementation solution of the DPP configuration process. In this solution, in the first network configuration process, the enrollee and the configurator exchange with each other key information, the first key information and the second key information, needed in the subsequent second network reconfiguration process, so that both the configurator and the enrollee generate the session key Ks that are needed in the next network reconfiguration process. In this way, the DPP configuration process can be performed directly based on the session key Ks in the network reconfiguration process, and it is unnecessary to perform the DPP authentication process again, thereby improving the provisioning efficiency.

The solutions provided in the above embodiments mainly involve a DPP configuration process. A method for generating a key implemented in a DPP authentication process is further provided in the embodiments of the present application below.

Figure 8:
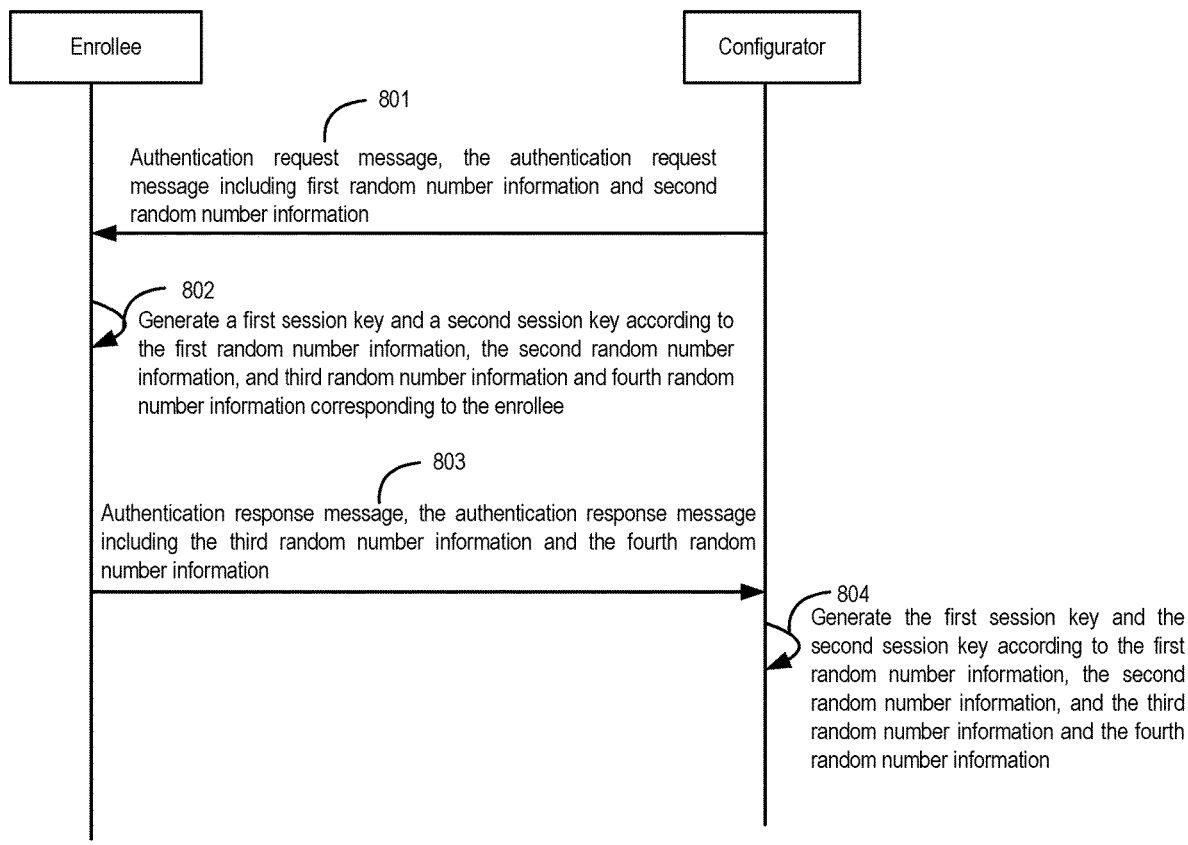
FIG. 8 is a schematic flowchart of a method for generating a key according to another embodiment of the present application.

FIG. 8 is a schematic flowchart of a method for generating a key according to another embodiment of the present application. As shown in FIG. 8, the method for generating a key includes the following steps:

In 801, a configurator sends an authentication request message to an enrollee, and the authentication request message includes first random number information and second random number information.

In 802, the enrollee generates a first session key and a second session key according to the first random number information, the second random number information, and third random number information and fourth random number information corresponding to the enrollee.

In 803, the enrollee sends an authentication response message corresponding to the authentication request message to the configurator, and the authentication response message includes the third random number information and fourth random number information.

In 804, the configurator generates the first session key and the second session key according to the first random number information, the second random number information, and the third random number information and the fourth random number information.

For ease of description below, the first random number information and the second random number information are represented as: I-nonce1 and I-nonce2, the third random number information and the fourth random number information are represented as: R-nonce1 and R-nonce2, and the first session key and the second session key are represented as: ke1 and ke2, respectively.

The method for generating a key provided in this embodiment may be applicable to a scenario in which a configurator performs network configuration on an enrollee.

Optionally, a two dimensional code may be set on the enrollee. When network configuration needs to be performed on the enrollee, the configurator can be triggered, by scanning the two dimensional code, to send the authentication request message to the enrollee.

It should be noted that in this embodiment, the description is made by using the configurator actively triggering the DPP authentication process as an example. In practice, the DPP authentication process may also be triggered by the enrollee. In this case, the enrollee sends, to the configurator, an authentication request message (which may be represented as a DPP authentication request) including the third random number information and the fourth random number information thereof, and the configurator sends, to the enrollee, an authentication response message (which may be represented as a DPP authentication response) including the first random number information and the second random number information thereof. At this time, optionally, a button for triggering provisioning may be disposed on the enrollee. When the user presses the button, the enrollee may be triggered to send an authentication request message to the configurator.

It can be understood that for both the configurator and the enrollee, the four random numbers described above, that is, I-nonce1, I-nonce2, R-nonce1, and R-nonce2, will be obtained.

In summary, for the configurator, the configurator may generate ke1 based on I-nonce1 and R-nonce1, and generate ke2 based on I-nonce2 and R-nonce2. Likewise, for the enrollee, the enrollee may also generate ke1 according to I-nonce1 and R-nonce1, and generate ke2 according to I-nonce2 and R-nonce2.

It should be noted that the enrollee may be configured to: upon receiving an authentication request message including two random numbers I-nonce1 and I-nonce2, thus knowing that two session keys need to be generated, wherein one is used in a first network configuration process of the configurator for the enrollee, and the other is used in a network reconfiguration process of the configurator for the enrollee. It is assumed that ke1 is used in the first network configuration process of the configurator for the enrollee, and ke2 is used in the network reconfiguration process of the configurator for the enrollee.

Certainly, optionally, the authentication request message may include a preset first identifier, and the first identifier instructs the enrollee to generate the session keys for performing network reconfiguration. In other words, the first identifier may be carried in the authentication request message, so that when receiving the authentication request message including the first identifier, the enrollee directly learns that two session keys, ke1 and ke2, need to be generated. In other words, the enrollee learns, based on the first identifier, that in addition to the session key ke1 used in the first network configuration process of the configurator for the enrollee, it also needs to generate the session key ke2 used in the network reconfiguration process of the configurator for the enrollee.

A detailed process of generating ke1 and ke2 is described below.

With respect to the enrollee:

Ke1=HKDF(I-nonce1|R-nonce1, "DPP Re-configuration Key", M.x|N.x[|L.x]);

Ke2=HKDF(I-nonce2|R-nonce2, "DPP Re-configuration Key", M.x|N.x[|L.x]).

Wherein, M.x represents a scalar of M, x may be an abscissa corresponding to the complex number M on an elliptic curve, M is generated by a public key $P_1$ in a protocol key pair of the configurator and a private key $b_R$ in a bootstrapping key pair of the enrollee, and the generation formula is:

$$M=b_R \times P_1.$$

Wherein, N.x represents a scalar of N, x may be an abscissa corresponding to the complex number N on the elliptic curve, N is generated by the public key $P_1$ in the protocol key pair of the configurator and a private key $p_R$ in a protocol key pair of the enrollee, and a generation formula is:

$$N=p_R \times P_1.$$

Wherein, L.x represents a scalar of L, x may be an abscissa corresponding to the complex number L on the elliptic curve, L is generated by the private key $b_R$ in the bootstrapping key pair of the enrollee as well as the private key $p_R$ in the protocol key pair of the enrollee and a public key $B_1$ in a bootstrapping key pair of the configurator, and a generation formula is:

$$L=((b_R+p_R) \text{ modulo } q) \times B_1$$

Wherein, I represents a merging (concatenation) operation, "DPP Re-configuration Key" represents a character string here, and a value of the character string may be self-defined. [ ] indicates a variable or field L.x in the square brackets is optional or used only under specific conditions. modulo q represents a modulo operation.

With respect to the configurator:

Ke1=HKDF(I-nonce1|R-nonce1, "DPP Re-configuration Key", M.x|N.x[|L.x]);

Ke2=HKDF (I-nonce2|R-nonce2, "DPP Re-configuration Key", M.x|N.x[|L.x]).

Wherein, M is generated by a private key $p_1$ in the protocol key pair of the configurator and a public key $B_R$ in the bootstrapping key pair of the enrollee, and a generation formula is:

$$M=p_1 \times B_R.$$

Wherein, N is generated by the private key $p_1$ in the protocol key pair of the configurator and a public key $P_R$ in the protocol key pair of the enrollee, and a generation formula is:

$$N=p_1 \times P_R.$$

Wherein, L is generated by a private key $b_1$ in the bootstrapping key pair of the configurator as well as the public key $P_R$ in the protocol key pair of the enrollee and the public key $B_R$ in the bootstrapping key pair of the enrollee, and a generation formula is:

$$L=b_1 \times (B_R+P_R).$$

It should be noted that for the configurator and the enrollee, the calculation methods of M, N, and L involved in the above formulas are different.

Optionally, the DPP authentication request message may further include information about the number of generated session keys. Network reconfiguration may need to be performed more than twice. Therefore, the configurator and the enrollee may generate more than two session keys in the DPP authentication process. For example, if the information about the number of generated session keys is 3, then 3 random numbers, I-nonce1, I-nonce2, and I-nonce3 in sequence, are carried in the DPP authentication request information sent to the enrollee by the configurator. After receiving the DPP authentication request message sent by the configurator, the enrollee generates 3 session keys Ke1, Ke2, and Ke3 in sequence according to the 3 received random numbers and 3 random numbers, R-nonce1, R-nonce2, and R-nonce3, generated by itself. Afterwards, the enrollee sends a DPP authentication reply message to the configurator, and the DPP authentication reply message includes R-nonce1, R-nonce2, and R-nonce3. After receiving the DPP authentication response message sent by the enrollee, the configurator generates 3 session keys Ke1, Ke2, and Ke3 in sequence according to the 3 received random numbers and 3 previously generated random numbers I-nonce1, I-nonce2, and I-nonce3. The three session keys are sequentially used in the first configuration process, the second configuration process, and the third configuration process. After receiving and sending a connection status query result message in the configuration process, the configurator and the enrollee will delete the session key used in the current provisioning process.

In a scenario in which the configurator performs network configuration on the enrollee, ke1 and ke2 generated above may be used in two subsequent DPP configuration processes. The process of using ke1 and ke2 will be described below with reference to the embodiment shown in FIG. 9.

Figure 9:
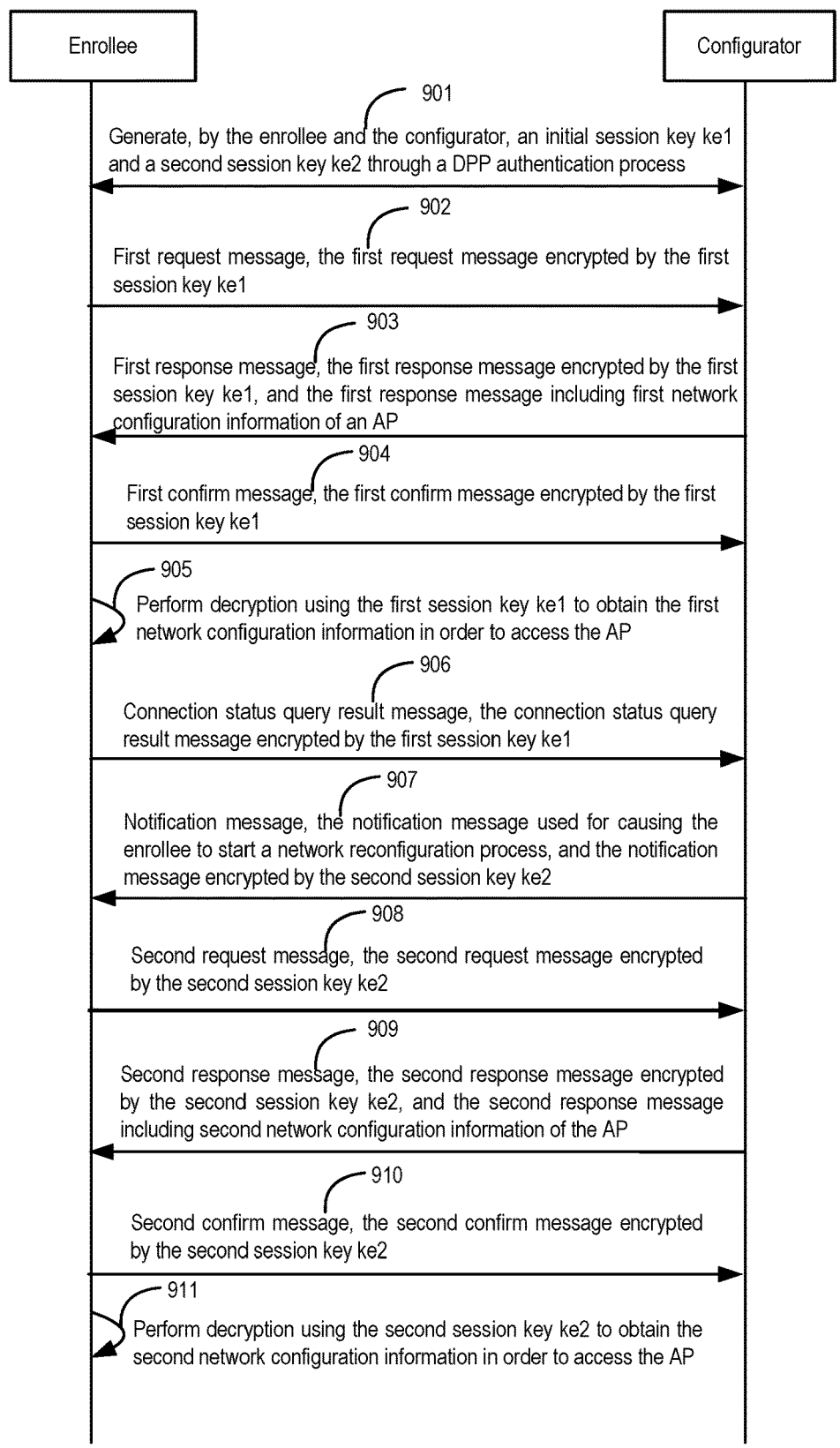
FIG. 9 is a schematic flowchart of performing network configuration using ke1 and ke2 according to an embodiment of the present application.

FIG. 9 is a schematic flowchart of performing network configuration using ke1 and ke2 according to an embodiment of the present application. As shown in FIG. 9, the following steps are included:

In 901, an enrollee and a configurator generate a first session key ke1 and a second session key ke2 in a DPP authentication process.

Wherein, reference is made to the description in the embodiment shown in FIG. 8 for the process of generating ke1 and ke2, which will not be described herein again.

In 902, the enrollee sends a first request message to the configurator, and the first request message is encrypted by the first session key ke1.

In 903, the configurator sends a first response message corresponding to the first request message to the enrollee, the first response message is encrypted by the first session key ke1, and the first response message includes first network configuration information of an AP.

In 904, the enrollee sends a first confirm message to the configurator, and the first confirm message is encrypted by the first session key ke1.

In 905, the enrollee performs decryption using the first session key ke1 to obtain the first network configuration information in order to access the AP.

In 906, the enrollee sends a connection status query result message to the configurator, and the connection status query result message is encrypted by the first session key ke1.

Optionally, after receiving the first confirm message, the enrollee may send a connection status query result message (which may be represented as: Status Query Result) to the configurator after a preset time interval to inform the configurator whether the enrollee and the AP are in a connected state.

In 907, the configurator sends a notification message to the enrollee, the notification message is used to cause the enrollee to start a network reconfiguration process, and the notification message is encrypted by the second session key ke2.

As described above, when the network configuration information of the AP changes from the first network configuration information to second network configuration information, and when the enrollee is a low power consumption device, the configurator may be triggered to send the notification message to the enrollee.

Optionally, when the network configuration information of the AP changes, the user may operate the configurator to scan a two dimensional code on the enrollee, so as to trigger the configurator to send the notification message to the enrollee.

It should be noted that the enrollee is often a low power consumption device. In order to reduce energy consumption, the enrollee is configured to operate in a passive monitoring mode, and when it discovers that the AP cannot be accessed, the enroller periodically monitor the notification message sent by the configurator. If the enrollee is not a low power consumption device, the enrollee may, upon detecting that the AP cannot be accessed, directly return to a configuration channel, and periodically send a DPP configuration request message (that is, corresponding to the second request message below) over the configuration channel, the sent DPP configuration request message is encrypted by Ks.

Optionally, the notification message may include a second identifier, and the second identifier is used to instruct the enrollee to start the network reconfiguration process.

In 908, the enrollee sends a second request message to the configurator, and the second request message is encrypted by the second session key ke2.

In 909, the configurator sends a second response message corresponding to the second request message to the enrollee, the second response message is encrypted by the second session key ke2, and the second response message includes the second network configuration information of the AP.

In 910, the enrollee sends a second confirm message to the configurator, and the second confirm message is encrypted by the second session key ke2.

In 911, the enrollee performs decryption using the second session key ke2 to obtain the second network configuration information in order to access the AP.

The key generation apparatus and the terminal provisioning apparatus in one or a plurality of embodiments of the present application will be described in detail below. Those skilled in the art can understand that all of these apparatuses may be constituted by using commercially available hardware components, through the steps taught in this solution.

Figure 10:
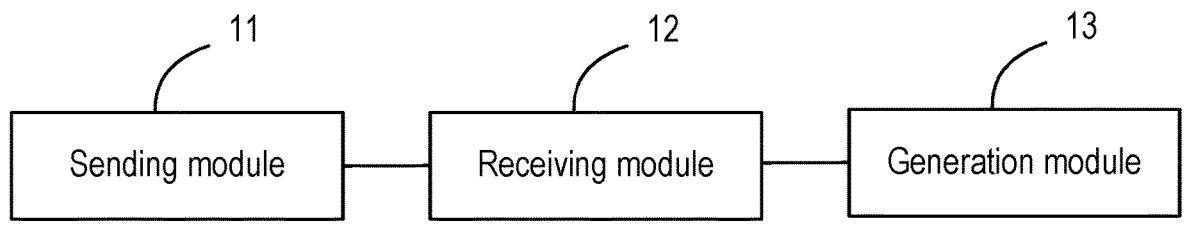
FIG. 10 is a schematic structural diagram of an apparatus for generating a key according to an embodiment of the present application.

FIG. 10 is a schematic structural diagram of an apparatus for generating a key according to an embodiment of the present application. As shown in FIG. 10, the apparatus includes: a sending module 11, a receiving module 12, and a generation module 13.

The sending module 11 is configured to send a first request message to a configurator, the first request message includes a first identifier, and the first identifier is used to instruct the configurator to perform a network reconfiguration operation.

The receiving module 12 is configured to receive a first message sent by the configurator, and the first message includes first key information.

The generation module 13 is configured to generate a session key according to the first key information.

The sending module 11 is further configured to send a second message to the configurator, and the second message includes second key information, thus allowing the configurator to generate the session key according to the second key information.

Optionally, the first message is a first response message corresponding to the first request message.

Optionally, the second message is a first confirm message corresponding to the first response message.

Optionally, the first message is a notification message, and the notification message is used to cause the enrollee to start a network reconfiguration process.

Optionally, the notification message includes a second identifier, and the second identifier is used to instruct the enrollee to start the network reconfiguration process.

Optionally, after sending the second message to the configurator, the sending module 11 is further configured to: send a second request message to the configurator, and the second request message is encrypted by the session key. The receiving module 12 is further configured to: receive a second response message sent by the configurator corresponding to the second request message, and the second response message is encrypted by the session key.

Optionally, after receiving the second response message sent by the configurator corresponding to the second request message, the sending module 11 is further configured to: send a second confirm message to the configurator, and the second confirm message is encrypted by the session key.

The apparatus shown in FIG. 10 can perform steps performed by the enrollee in the embodiments shown in FIG. 1 to FIG. 3. For the parts not described in detail in this embodiment, reference can be made to the related description of the aforementioned embodiments, which will not be described herein again.

Figure 11:
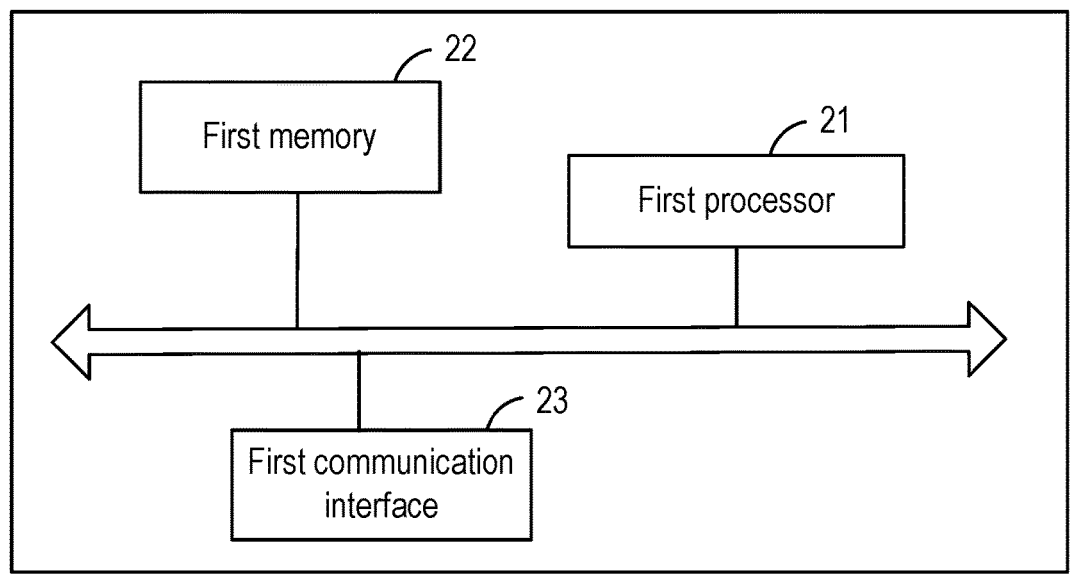
FIG. 11 is a schematic structural diagram of an enrollee corresponding to the apparatus for generating a key according to the embodiment shown in FIG. 10.

In one possible design, the structure of the apparatus for generating a key shown in the above FIG. 10 may be implemented as an enrollee. As shown in FIG. 11, the enrollee may include: a first processor 21 and a first memory 22. Wherein, the first memory 22 stores executable code, and the executable code, when executed by the first processor 21, at least causes the first processor 21 to implement various steps performed by the enrollee in the aforementioned embodiments shown in FIG. 1 to FIG. 3.

Wherein, the structure of the enrollee may further include a first communication interface 23 configured to communicate with another device or a communication network.

In addition, a non-transitory machine-readable storage medium is provided in an embodiment of the present application, the non-transitory machine-readable storage medium stores executable code, and the executable code, when executed by a processor of an enrollee, causes the processor to perform various steps performed by the enrollee in the aforementioned embodiments shown in FIG. 1 to FIG. 3.

Figure 12:
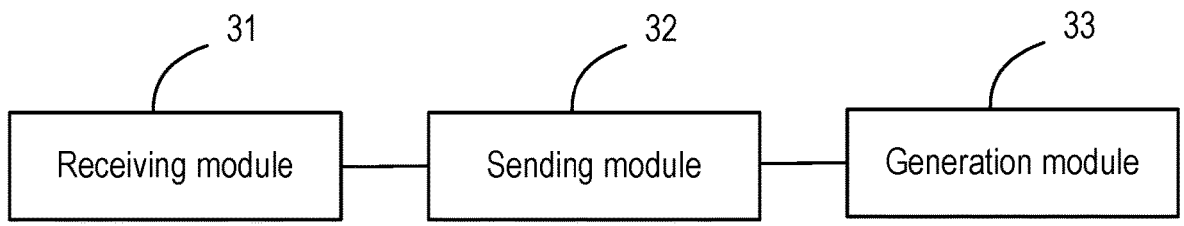
FIG. 12 is a schematic structural diagram of another apparatus for generating a key according to an embodiment of the present application.

FIG. 12 is a schematic structural diagram of another apparatus for generating a key according to an embodiment of the present application. As shown in FIG. 12, the apparatus includes: a receiving module 31, a sending module 32, and a generation module 33.

The receiving module 31 is configured to receive a first request message sent by an enrollee, the first request message comprises a first identifier, and the first identifier is used to instruct the configurator to perform a network reconfiguration operation.

The sending module 32 is configured to send a first message to the enrollee according to the first identifier, and the first message comprises first key information, thus allowing the enrollee to generate a session key according to the first key information.

The receiving module 31 is further configured to receive a second message sent by the enrollee, and the second message includes second key information.

The generation module 33 is configured to generate the session key according to the second key information.

Optionally, the first message is a first response message corresponding to the first request message.

Optionally, the second message is a first confirm message corresponding to the first response message.

Optionally, the first message is a notification message, and the notification message is used to cause the enrollee to start a network reconfiguration process.

Optionally, the notification message includes a second identifier, and the second identifier is used to instruct the enrollee to start the network reconfiguration process.

Optionally, after the session key is generated according to the second key information, the receiving module 31 is further configured to: receive a second request message sent by the enrollee, and the second request message is encrypted by the session key. The sending module 32 is further configured to: send a second response message corresponding to the second request message to the enrollee, and the second response message is encrypted by the session key. The receiving module 31 is further configured to: receive a second confirm message sent by the enrollee, and the second confirm message is encrypted by the session key.

The apparatus shown in FIG. 12 can perform steps performed by the configurator in the aforementioned embodiments shown in FIG. 1 to FIG. 3. For the parts not described in detail in this embodiment, reference can be made to the related description of the aforementioned embodiments, which will not be described herein again.

Figure 13:
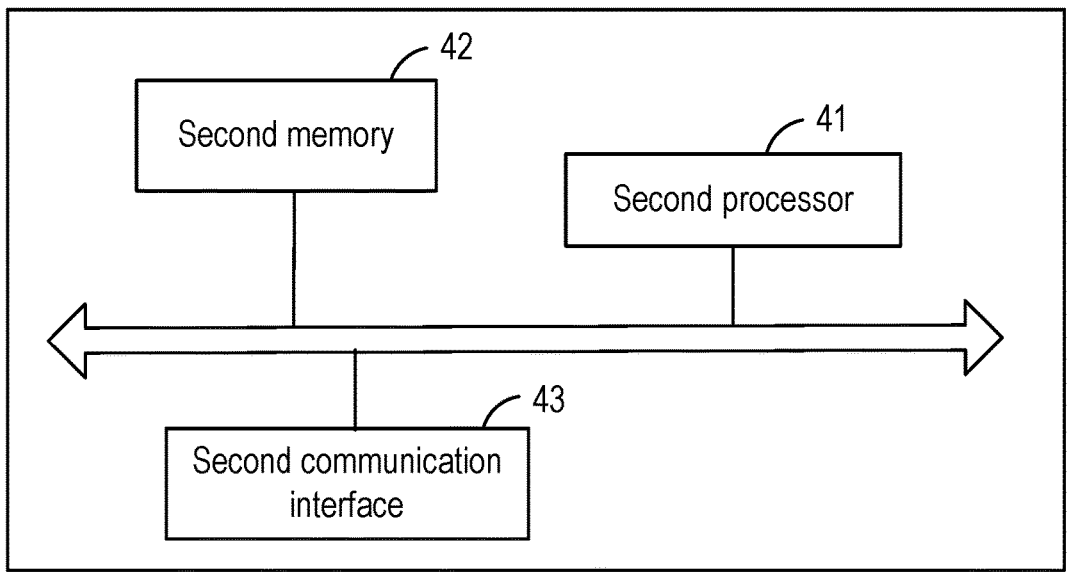
FIG. 13 is a schematic structural diagram of a configurator corresponding to the apparatus for generating a key according to the embodiment shown in FIG. 12.

In one possible design, the structure of the apparatus for generating a key shown in FIG. 12 above may be implemented as a configurator. As shown in FIG. 13, the configurator may include: a second processor 41 and a second memory 42. The second memory 42 stores executable code, and the executable code, when executed by the second processor 41, at least causes the second processor 41 to implement various steps performed by the configurator in the aforementioned embodiments shown in FIG. 1 to FIG. 3.

The structure of the configurator may further include a second communication interface 43 configured to communicate with another device or a communication network.

In addition, non-transitory machine-readable storage medium is provided in an embodiment of the present application, the non-transitory machine-readable storage medium stores executable code, and the executable code, when executed by a processor of a configurator, causes the processor to perform various steps performed by the configurator in the aforementioned embodiments shown in FIG. 1 to FIG. 3.

Figure 14:
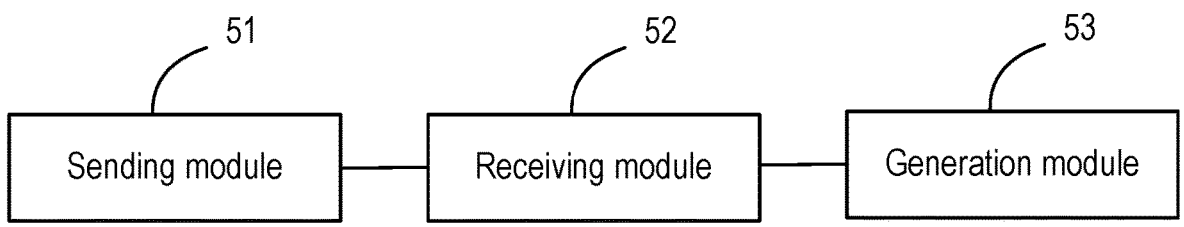
FIG. 14 is a schematic structural diagram of a terminal provisioning apparatus according to an embodiment of the present application.

FIG. 14 is a schematic structural diagram of a terminal provisioning apparatus according to an embodiment of the present application. The terminal provisioning apparatus is located in an enrollee. As shown in FIG. 14, the apparatus includes: a sending module 51, a receiving module 52, and a generation module 53.

The sending module 51 is configured to send a first request message to a configurator, the first request message includes a first identifier, and the first identifier is used to instruct the configurator to perform a network reconfiguration operation.

The receiving module 52 is configured to receive a first message sent by the configurator, and the first message includes first key information.

The generation module 53 is configured to generate a session key according to the first key information.

The sending module 51 is further configured to send a second message to the configurator, and the second message includes second key information, thus allowing the configurator to generate the session key according to the second key information; and the session key is used in a network reconfiguration process performed on the enrollee.

Optionally, the first message is a first response message corresponding to the first request message.

Optionally, the second message is a first confirm message corresponding to the first response message.

Optionally, after the first request message is sent to the configurator, the receiving module 52 is further configured to: receive a first response message sent by the configurator corresponding to the first request message, and the first response message includes first network configuration information of an access point.

Optionally, the sending module 51 is further configured to: send a connection status query result message to the configurator, and the second message is the connection status query result message.

Optionally, after the connection status query result message is sent to the configurator, the receiving module 52 is further configured to: receive a notification message sent by the configurator, the notification message is used to cause the enrollee to start the network reconfiguration process, and the first message is the notification message.

Optionally, the sending module 51 is further configured to: send a second request message to the configurator, and the second request message is encrypted by the session key. The receiving module 52 is further configured to: receive a second response message sent by the configurator corresponding to the second request message, the second response message includes second network configuration information of the access point, and the second response message is encrypted by the session key. The sending module 51 is further configured to: send a second confirm message to the configurator, and the second confirm message is encrypted by the session key.

The apparatus shown in FIG. 14 can perform steps performed by the enrollee in the aforementioned embodiments shown in FIG. 4 to FIG. 7. For the parts not described in detail in this embodiment, reference can be made to the related description of the aforementioned embodiments, which will not be described herein again.

Figure 15:
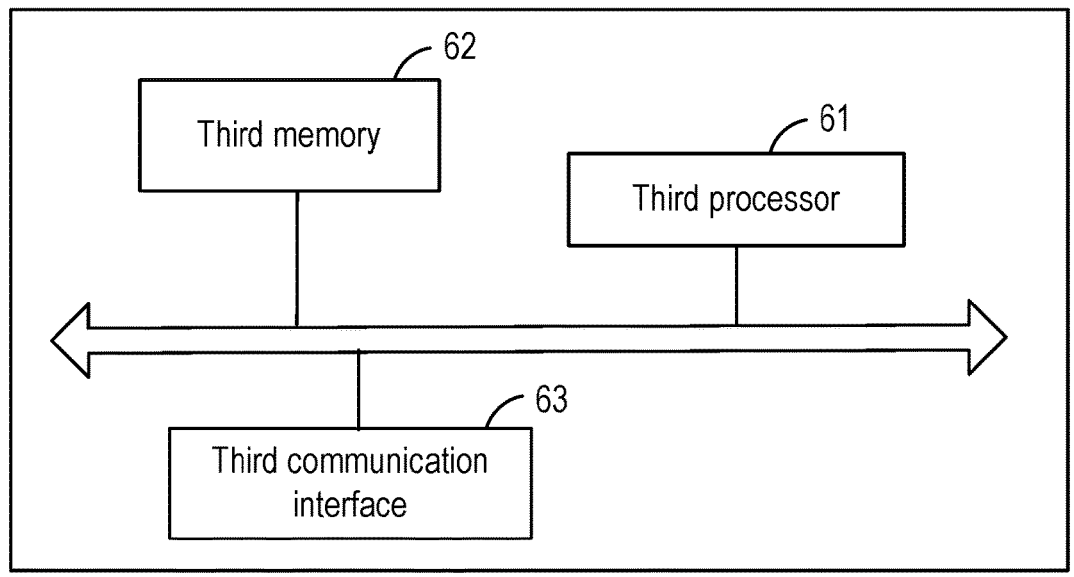
FIG. 15 is a schematic structural diagram of an enrollee corresponding to the terminal provisioning apparatus according to the embodiment shown in FIG. 14.

In one possible design, the structure of the terminal provisioning apparatus shown in FIG. 14 may be implemented as an enrollee. As shown in FIG. 15, the enrollee may include: a third processor 61 and a third memory 62.

Wherein, the third memory 62 stores executable code thereon, and the executable code, when executed by the third processor 61, at least causes the third processor 61 to implement various steps performed by the enrollee in the aforementioned embodiments shown in FIG. 4 to FIG. 7.

Wherein, the structure of the enrollee may further include a third communication interface 63 configured to communicate with another device or a communication network.

In addition, a non-transitory machine-readable storage medium is provided in an embodiment of the present application, the non-transitory machine-readable storage medium stores executable code, and the executable code, when executed by a processor of an enrollee, causes the processor to perform various steps performed by the enrollee in the aforementioned embodiments shown in FIG. 4 to FIG. 7.

Figure 16:
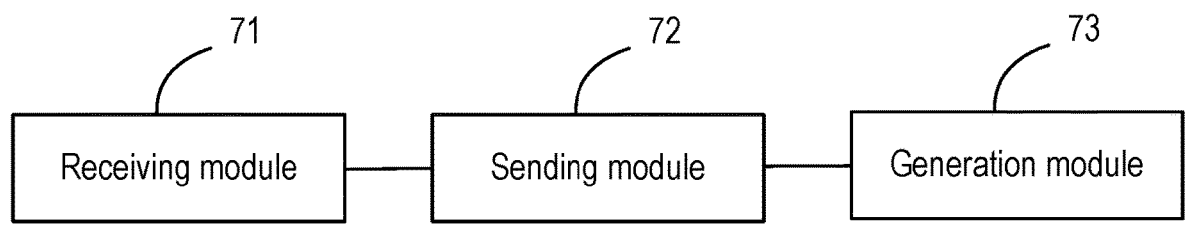
FIG. 16 is a schematic structural diagram of another terminal provisioning apparatus according to an embodiment of the present application.

FIG. 16 is a schematic structural diagram of another terminal provisioning apparatus located in an enrollee according to an embodiment of the present application. As shown in FIG. 16, the apparatus includes: a receiving module 71, a sending module 72, and a generation module 73.

The receiving module 71 is configured to receive a first request message sent by an enrollee, the first request message comprises a first identifier, and the first identifier is used to instruct the configurator to perform a network reconfiguration operation.

The sending module 72 is configured to send a first message to the enrollee according to the first identifier, and the first message comprises first key information, thus allowing the enrollee to generate a session key according to the first key information.

The receiving module 71 is further configured to receive a second message sent by the enrollee, and the second message includes second key information.

The generation module 73 is configured to generate the session key according to the second key information; and the session key is used in a network reconfiguration process performed on the enrollee.

Optionally, the first message is a first response message corresponding to the first request message.

Optionally, the second message is a first confirm message corresponding to the first response message.

Optionally, the sending module 72 is further configured to: send a first response message corresponding to the first request message to the enrollee, and the first response message includes first network configuration information of an access point.

Optionally, after the first response message corresponding to the first request message is sent to the enrollee, the receiving module 71 is further configured to: receive a connection status query result message sent by the enrollee, and the second message is the connection status query result message. The sending module 72 is further configured to: send a notification message to the enrollee, the notification message is used to cause the enrollee to start a network reconfiguration process, and the first message is the notification message.

Optionally, the receiving module 71 is further configured to: receive a second request message sent by the enrollee, and the second request message is encrypted by the session key. The sending module 72 is further configured to: send a second response message corresponding to the second request message to the enrollee, the second response message is encrypted by the session key, and the second response message includes second network configuration information of the access point. The receiving module 71 is further configured to: receive a second confirm message sent by the enrollee, and the second confirm message is encrypted by the session key.

The apparatus shown in FIG. 16 can perform steps performed by the configurator in the aforementioned embodiments shown in FIG. 4 to FIG. 7. For the parts not described in detail in this embodiment, reference can be made to the related description of the aforementioned embodiments, which will not be described herein again.

Figure 17:
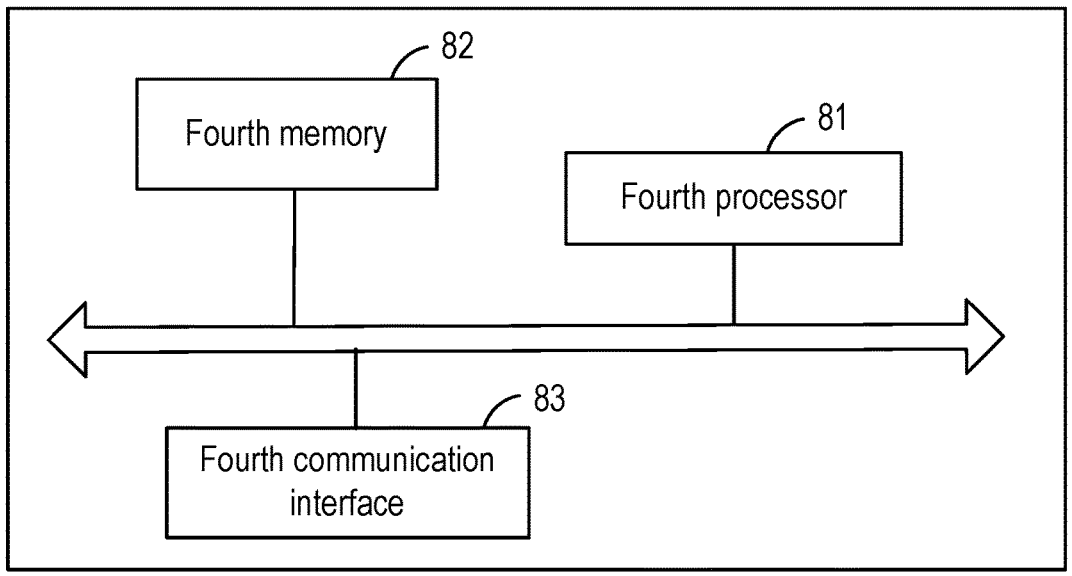
FIG. 17 is a schematic structural diagram of a configurator corresponding to the terminal provisioning apparatus according to the embodiment shown in FIG. 16.

In one possible design, the structure of the terminal provisioning apparatus shown in FIG. 16 may be implemented as a configurator. As shown in FIG. 17, the configurator may include: a fourth processor 81 and a fourth memory 82. Wherein, the fourth memory 82 stores executable code, and the executable code, when executed by the fourth processor 81, at least causes the fourth processor 81 to implement various steps performed by the configurator in the aforementioned embodiments shown in FIG. 4 to FIG. 7.

Wherein, the structure of the configurator may further include a fourth communication interface 83 configured to communicate with another device or a communication network.

In addition, a non-transitory machine-readable storage medium is provided in an embodiment of the present application, the non-transitory machine-readable storage medium stores executable code, and the executable code, when executed by a processor of a configurator, causes the processor to perform various steps performed by the configurator in the aforementioned embodiments shown in FIG. 4 to FIG. 7.

Figure 18:
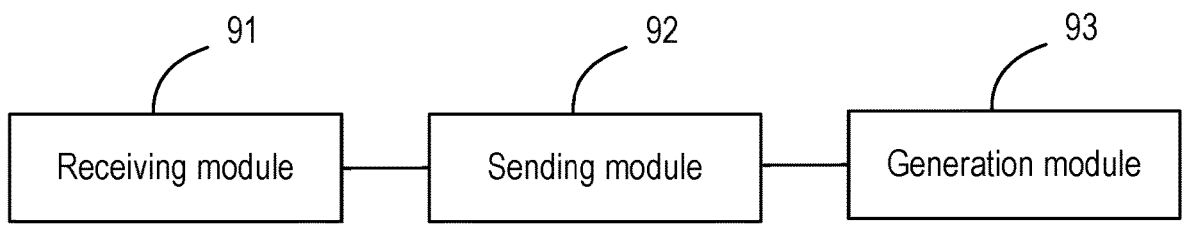
FIG. 18 is a schematic structural diagram of another apparatus for generating a key according to an embodiment of the present application.

FIG. 18 is a schematic structural diagram of another apparatus for generating a key according to an embodiment of the present application. As shown in FIG. 18, the apparatus includes: a receiving module 91, a generation module 92, and a sending module 93.

The receiving module 91 is configured to receive an authentication request message sent by a configurator, and the authentication request message comprises first random number information and second random number information.

The generation module 92 is configured to generate a first session key and a second session key according to the first random number information, the second random number information, and third random number information and fourth random number information corresponding to the enrollee.

The sending module 93 is configured to send an authentication response message corresponding to the authentication request message to the configurator, and the authentication response message comprises the third random number information and the fourth random number information, thus allowing the configurator to generate the first session key and the second session key according to the first random number information, the second random number information, and the third random number information and the fourth random number information.

Optionally, the authentication request message includes a first identifier, and the first identifier instructs the enrollee to generate the session keys for performing network reconfiguration.

Optionally, the sending module 93 is further configured to: send a first request message to the configurator, and the first request message is encrypted by the first session key. The receiving module 91 is further configured to: receive a first response message sent by the configurator corresponding to the first request message, the first response message is encrypted by the first session key, and the first response message includes first network configuration information of an access point. The sending module 93 is further configured to: send a first confirm message to the configurator, and the first confirm message is encrypted by the first session key.

Optionally, the sending module 93 is further configured to: send a connection status query result message to the configurator, and the connection status query result message is encrypted by the first session key.

Optionally, the receiving module 91 is further configured to: receive a notification message sent by the configurator, the notification message is used to cause the enrollee to start a network reconfiguration process, and the notification message is encrypted by the second session key.

Wherein, optionally, the notification message includes a second identifier, and the second identifier is used to instruct the enrollee to start the network reconfiguration process.

Optionally, after the notification message sent by the configurator is received, the sending module 93 is further configured to: send a second request message to the configurator, and the second request message is encrypted by the second session key. The receiving module 91 is further configured to: receive a second response message sent by the configurator corresponding to the second request message, the second response message is encrypted by the second session key, and the second response message includes second network configuration information of the access point. The sending module 93 is further configured to: send a second confirm message to the configurator, and the second confirm message is encrypted by the second session key.

The apparatus shown in FIG. 18 can perform steps performed by the enrollee in the embodiments shown in FIG. 8 to FIG. 9. For the parts not described in detail in this embodiment, reference can be made to the related description of the aforementioned embodiments, which will not be described herein again.

Figure 19:
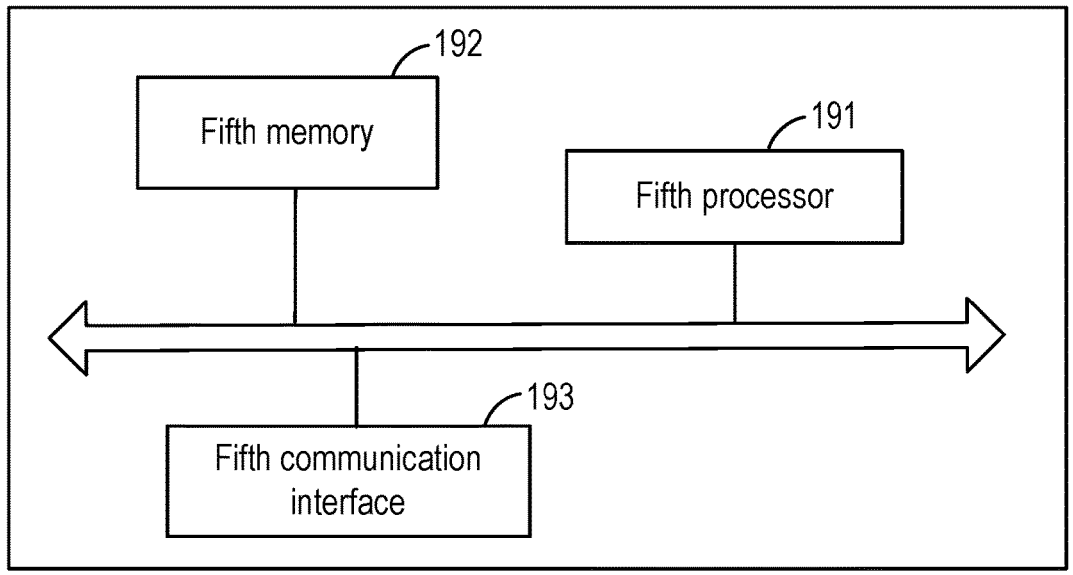
FIG. 19 is a schematic structural diagram of an enrollee corresponding to the apparatus for generating a key according to the embodiment shown in FIG. 18.

In one possible design, the structure of the apparatus for generating a key shown in above FIG. 18 may be implemented as an enrollee. As shown in FIG. 19, the enrollee may include: a fifth processor 191 and a fifth memory 192. Wherein, the fifth memory 192 stores executable code thereon, and the executable code, when executed by the fifth processor 191, at least causes the fifth processor 191 to implement various steps performed by the enrollee in the aforementioned embodiments shown in FIG. 8 to FIG. 9.

Wherein, the structure of the enrollee may further include a fifth communication interface 193 configured to communicate with another device or a communication network.

In addition, a non-transitory machine-readable storage medium is provided in an embodiment of the present application, the non-transitory machine-readable storage medium stores executable code, and the executable code, when executed by a processor of an enrollee, causes the processor to perform various steps performed by the enrollee in the aforementioned embodiments shown in FIG. 8 to FIG. 9.

Figure 20:
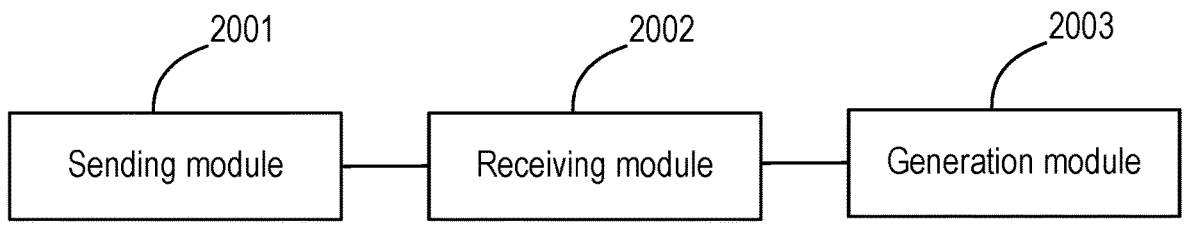
FIG. 20 is a schematic structural diagram of another apparatus for generating a key according to an embodiment of the present application.

FIG. 20 is a schematic structural diagram of another apparatus for generating a key according to an embodiment of the present application. As shown in FIG. 20, the apparatus includes: a sending module 2001, a receiving module 2002, and a generation module 2003.

The sending module 2001 is configured to send an authentication request message to an enrollee, and the authentication request message includes first random number information and second random number information, thus allowing the enrollee to generate a first session key and a second session key according to the first random number information, the second random number information, and third random number information and fourth random number information corresponding to the enrollee.

The receiving module 2002 is configured to receive an authentication response message sent by the enrollee corresponding to the authentication request message, and the authentication response message includes the third random number information and the fourth random number information.

The generation module 2003 is configured to generate the first session key and the second session key according to the first random number information, the second random number information, and the third random number information and the fourth random number information.

Optionally, the authentication request message includes a first identifier, and the first identifier instructs the enrollee to generate the session keys for performing network reconfiguration.

Optionally, the receiving module 2002 is further configured to: receive a first request message sent by the enrollee, and the first request message is encrypted by the first session key. The sending module 2001 is further configured to: send a first response message corresponding to the first request message to the enrollee, the first response message is encrypted by the first session key, and the first response message includes first network configuration information of an access point. The receiving module 2002 is further configured to: receive a first confirm message sent by the enrollee, and the first confirm message is encrypted by the first session key.

Optionally, after a first response message corresponding to the first request message is sent to the enrollee, the receiving module 2002 is further configured to: receive, by the configurator, a connection status query result message sent by the enrollee, and the connection status query result message is encrypted by the first session key.

Optionally, the sending module 2001 is further configured to: send a notification message to the enrollee, the notification message is used to cause the enrollee to start a network reconfiguration process, and the notification message is encrypted by the second session key.

Wherein, optionally, the notification message includes a second identifier, and the second identifier is used to instruct the enrollee to start the network reconfiguration process.

Optionally, after the notification message is sent, the receiving module 2002 is further configured to: receive, by the configurator, a second request message sent by the enrollee, and the second request message is encrypted by the second session key. The sending module 2001 is further configured to: send a second response message corresponding to the second request message to the enrollee, the second response message is encrypted by the second session key, and the second response message includes second network configuration information of the access point. The receiving module 2002 is further configured to: receive a second confirm message sent by the enrollee, and the second confirm message is encrypted by the second session key.

The apparatus shown in FIG. 20 can perform steps performed by the configurator in the aforementioned embodiments shown in FIG. 8 to FIG. 9. For the parts not described in detail in this embodiment, reference can be made to the related description of the aforementioned embodiments, which will not be described herein again.

Figure 21:
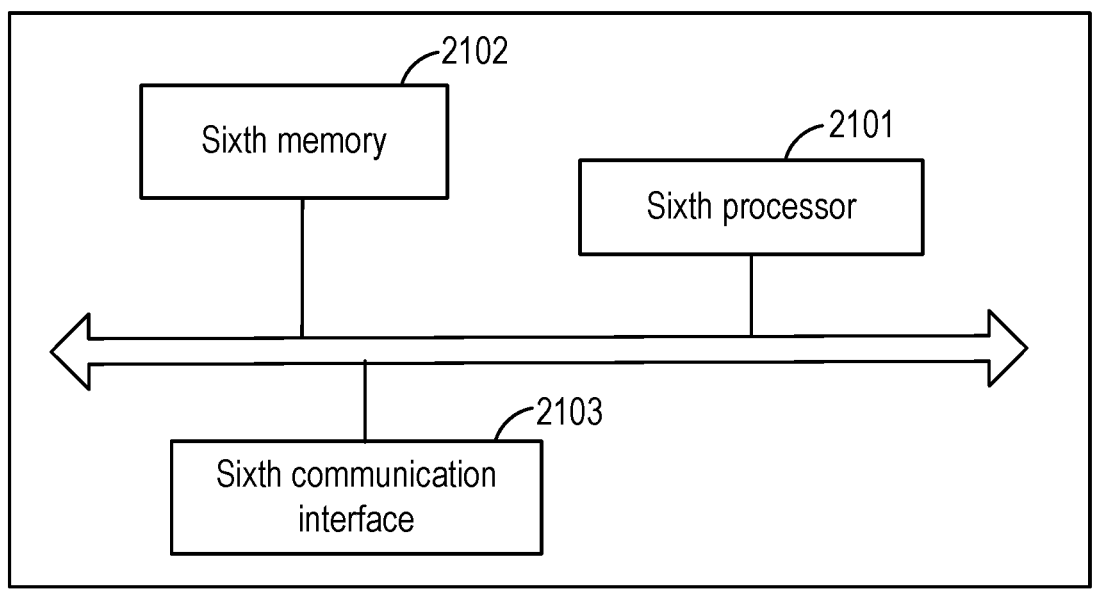
FIG. 21 is a schematic structural diagram of a configurator corresponding to the apparatus for generating a key according to the embodiment shown in FIG. 20.

In one possible design, the structure of the apparatus for generating a key shown in above FIG. 20 may be implemented as a configurator. As shown in FIG. 21, the configurator may include: a sixth processor 2101 and a sixth memory 2102. Wherein, the sixth memory 2102 stores executable code, and the executable code, when executed by the sixth processor 2101, at least causes the sixth processor 2101 to implement various steps performed by the configurator in the aforementioned embodiments shown in FIG. 8 to FIG. 9.

Wherein, the structure of the configurator may further include a sixth communication interface 2103 configured to communicate with another device or a communication network.

In addition, a non-transitory machine-readable storage medium is provided in an embodiment of the present application, the non-transitory machine-readable storage medium stores executable code, and the executable code, when executed by a processor of a configurator, causes the processor to perform various steps performed by the configurator in the aforementioned embodiments shown in FIG. 8 to FIG. 9.

The apparatus embodiments described above are only exemplary, in which the units described as discrete components may or may not be physically separated. Some or all modules may be selected to realize the purpose of the technical solution provided by the embodiments according to the actual needs. Those of ordinary skill in the art can understand and implement the technical solution without inventive effort.

From the description of the above implementations, those skilled in the art can clearly understand that the implementations may be implemented by means of a necessary general-purpose hardware platform, and definitely may be implemented by a combination of hardware and software. Based on such understanding, the technical solution essentially, or parts that contribute to the prior art, may be embodied in the form of a computer product. The present application may use the form of a computer program product implemented on one or a plurality of computer-usable storage media (including, but not limited to, a magnetic disk memory, a CD-ROM, an optical memory, and so on) comprising computer-usable program code therein.

The network configuration method provided in the embodiment of the present application may be performed by one or a plurality of programs/software. The program/software may be provided by a network side. The configurator and the enrollee mentioned in the foregoing embodiments may download the required corresponding program/software to a local non-volatile storage medium. Moreover, when the method for generating a key and the terminal provisioning method need to be performed, the program/software is read into a memory through a CPU, and then the CPU executes the program/software to implement the method for generating a key and the terminal provisioning method provided in the aforementioned embodiments. For an execution process, reference can be made to the schematic diagrams in FIG. 1 to FIG. 9.

Finally, it should be noted that the above embodiments are merely used to illustrate, but not limited to, the technical solutions of the present application. Although the present application is described in detail with reference to the foregoing embodiments, those of ordinary skill in the art should understand that: the technical solutions recorded in the foregoing embodiments can still be modified, or part of the technical features therein may be equivalently replaced. However, these modifications or replacements do not cause the essence of the corresponding technical solutions to depart from the spirit and scope of the technical solutions in the embodiments of the present application.

The invention claimed is:

1. A method for provisioning an enrollee by a configurator, comprising:
    sending, by the enrollee comprising a first processor and a first memory, a first request message to the configurator comprising a second processor and a second memory, the first request message comprising a first identifier, and the first identifier indicating a network reconfiguration capability of the enrollee;
    receiving, by the enrollee from the configurator, a first response message corresponding to the first request message, the first response message comprising first key information;
    generating, by the enrollee, a session key according to the first key information; and
    sending, by the enrollee to the configurator, a first confirm message corresponding to the first response message, the first confirm message comprising second key information, thus allowing the configurator to generate the session key according to the second key information; and the session key used in a network reconfiguration process performed by the configurator on the enrollee.

2. The method according to claim 1, wherein the first response message comprises first network configuration information of an access point.

3. The method according to claim 2, further comprising:
    sending, by the enrollee, a connection status query result message to the configurator;
    receiving, by the enrollee from the configurator, a notification message; and
    in response to the notification message, starting a network reconfiguration process.

4. The method according to claim 2, further comprising:
    sending, by the enrollee, a second request message to the configurator, the second request message encrypted by the session key; and
    receiving, by the enrollee from the configurator, a second response message corresponding to the second request message, the second response message comprising second network configuration information of the access point, and the second response message encrypted by the session key.

5. The method according to claim 4, further comprising:
    sending, by the enrollee to the configurator, a second confirm message corresponding to the second response message, the second confirm message encrypted by the session key.

6. A terminal provisioning method for provisioning an enrollee by a configurator, comprising:
    receiving, by a configurator comprising a second processor and a second memory, a first request message sent by an enrollee comprising a first processor and a first memory, the first request message comprising a first identifier, and the first identifier indicating a network reconfiguration capability of the enrollee;
    sending, by the configurator to the enrollee, a first response message corresponding to the first request message, the first response message comprising first key information, thus allowing the enrollee to generate a session key according to the first key information;
    receiving, by the configurator from the enrollee, a first confirm message corresponding to the first response message, the first confirm message comprising second key information; and
    generating, by the configurator, the session key according to the second key information; and the session key used in a network reconfiguration process performed by the configurator on the enrollee.

7. The method according to claim 6, wherein the first response message comprises first network configuration information of an access point.

8. The method according to claim 7, further comprising:
receiving, by the configurator, a connection status query result message sent by the enrollee;
sending, by the configurator, a notification message to the enrollee to cause the enrollee to start a network reconfiguration process.

9. The method according to claim 7, further comprising:
receiving, by the configurator, a second request message sent by the enrollee, the second request message encrypted by the session key; and
sending, by the configurator, a second response message corresponding to the second request message to the enrollee, the second response message encrypted by the session key, and the second response message comprising second network configuration information of the access point.

10. The method according to claim 9, further comprising:
receiving, by the configurator from the enrollee, a second confirm message corresponding to the second response message, the second confirm message encrypted by the session key.

* * * * *